US00RE45348E

(19) United States
(12) Reissued Patent
Fiatal et al.

(10) Patent Number: US RE45,348 E
(45) Date of Reissued Patent: *Jan. 20, 2015

(54) METHOD AND APPARATUS FOR INTERCEPTING EVENTS IN A COMMUNICATION SYSTEM

(75) Inventors: Trevor A. Fiatal, Fremont, CA (US); Jay Sutaria, Los Altos Hills, CA (US); Sridhar Nanjundeswaran, Palo Alto, CA (US); Shailesh Bavadekar, Fremont, CA (US)

(73) Assignee: Seven Networks, Inc., San Carlos, CA (US)

( * ) Notice: This patent is subject to a terminal disclaimer.

(21) Appl. No.: 13/423,112

(22) Filed: Mar. 16, 2012 (Under 37 CFR 1.47)

Related U.S. Patent Documents

Reissue of:
(64) Patent No.: 7,680,281
Issued: Mar. 16, 2010
Appl. No.: 12/211,790
Filed: Sep. 16, 2008

U.S. Applications:
(63) Continuation of application No. 11/255,291, filed on Oct. 20, 2005, now Pat. No. 7,441,271.

(60) Provisional application No. 60/620,889, filed on Oct. 20, 2004.

(51) Int. Cl.
*H04L 29/06* (2006.01)

(52) U.S. Cl.
USPC ..... 380/255

(58) Field of Classification Search
USPC ..... 380/255; 726/22; 705/14.23; 713/150
See application file for complete search history.

(56) References Cited

U.S. PATENT DOCUMENTS

| | | | |
|---|---|---|---|
| 222,458 | A | 12/1879 | Connolly et al. |
| 447,918 | A | 3/1891 | Strowger |
| 4,200,770 | A | 4/1980 | Hellman et al. |
| 4,255,796 | A | 3/1981 | Gabbe et al. |

(Continued)

FOREIGN PATENT DOCUMENTS

| | | | |
|---|---|---|---|
| EP | 0772327 | A2 | 5/1997 |
| EP | 1278390 | A1 | 1/2003 |

(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

*Primary Examiner* — Ali Abyaneh
(74) *Attorney, Agent, or Firm* — NKK Patent Law, PLLC

(57) ABSTRACT

An intercept system provides more effective and more efficient compliance with legal intercept warrants. The intercept system can provide any combination of operations that include near-real-time intercept, capture of intercepted data in structured authenticated form, clear text intercept for communications where there is access to encryption keys, cipher text intercept for communications where there is no access to encryption keys, provision of transactional logs to the authorized agency, interception without altering the operation of the target services, and encryption of stored intercepted information.

45 Claims, 6 Drawing Sheets

(56) References Cited

U.S. PATENT DOCUMENTS 4,276,597 A 6/1981 Dissly et al.
4,531,020 A 7/1985 Wechselberger et al.
4,807,182 A 2/1989 Queen
4,831,582 A 5/1989 Miller et al.
4,875,159 A 10/1989 Cary et al.
4,897,781 A 1/1990 Chang et al.
4,972,457 A 11/1990 O'Sullivan
5,008,853 A 4/1991 Bly et al.
5,159,624 A 10/1992 Makita
5,220,657 A 6/1993 Bly et al.
5,263,157 A 11/1993 Janis
5,283,856 A 2/1994 Gross et al.
5,357,431 A 10/1994 Nakada et al.
5,384,892 A 1/1995 Strong
5,386,564 A 1/1995 Shearer et al.
5,392,390 A 2/1995 Crozier
5,434,994 A 7/1995 Shaheen et al.
5,436,960 A 7/1995 Campana, Jr. et al.
5,438,611 A 8/1995 Campana, Jr. et al.
5,479,472 A 12/1995 Campana, Jr. et al.
5,487,100 A 1/1996 Kane
5,491,703 A 2/1996 Barnaby et al.
5,493,692 A 2/1996 Theimer et al.
5,519,606 A 5/1996 Frid-Nielsen et al.
5,555,376 A 9/1996 Theimer et al.
5,559,800 A 9/1996 Mousseau et al.
5,572,571 A 11/1996 Shirai
5,572,643 A 11/1996 Judson
5,574,859 A 11/1996 Yeh
5,581,749 A 12/1996 Hossain et al.
5,600,834 A 2/1997 Howard
5,603,054 A 2/1997 Theimer et al.
5,604,788 A 2/1997 Tett
5,613,012 A 3/1997 Hoffman et al.
5,619,507 A 4/1997 Tsuda
5,619,648 A 4/1997 Canale et al.
5,623,601 A 4/1997 Vu
5,625,670 A 4/1997 Campana, Jr. et al.
5,625,815 A 4/1997 Maier et al.
5,627,658 A 5/1997 Connors et al.
5,630,081 A 5/1997 Rybicki et al.
5,631,946 A 5/1997 Campana, Jr. et al.
5,632,018 A 5/1997 Otorii
5,634,053 A 5/1997 Noble et al.
5,647,002 A 7/1997 Brunson
5,652,884 A 7/1997 Palevich
5,664,207 A 9/1997 Crumpler et al.
5,666,530 A 9/1997 Clark et al.
5,666,553 A 9/1997 Crozier
5,680,542 A 10/1997 Mulchandani et al.
5,682,524 A 10/1997 Freund et al.
5,684,990 A 11/1997 Boothby
5,689,654 A 11/1997 Kikinis et al.
5,692,039 A 11/1997 Brankley et al.
5,696,903 A 12/1997 Mahany
5,701,423 A 12/1997 Crozier
5,701,469 A 12/1997 Brandli et al.
5,704,029 A 12/1997 Wright, Jr.
5,706,211 A 1/1998 Beletic et al.
5,706,502 A 1/1998 Foley et al.
5,706,507 A 1/1998 Schloss
5,710,918 A 1/1998 Lagarde et al.
5,713,019 A 1/1998 Keaten
5,715,403 A 2/1998 Stefik
5,717,925 A 2/1998 Harper
5,721,908 A 2/1998 Lagarde et al.
5,721,914 A 2/1998 DeVries
5,727,202 A 3/1998 Kucala
5,729,549 A 3/1998 Kostreski et al.
5,729,704 A 3/1998 Stone et al.
5,729,735 A 3/1998 Meyering
5,742,905 A 4/1998 Pepe et al.
5,745,360 A 4/1998 Leone et al.
5,752,186 A 5/1998 Malackowski et al.
5,752,246 A 5/1998 Rogers et al.
5,754,938 A 5/1998 Herz et al.
5,757,916 A 5/1998 MacDoran et al.
5,758,088 A 5/1998 Bezaire et al.
5,758,150 A 5/1998 Bell et al.
5,758,322 A 5/1998 Rongley
5,758,354 A 5/1998 Huang et al.
5,758,355 A 5/1998 Buchanan
5,765,171 A 6/1998 Gehani et al.
5,778,346 A 7/1998 Frid-Neilsen et al.
5,778,361 A 7/1998 Nanjo et al.
5,781,614 A 7/1998 Brunson
5,781,901 A 7/1998 Kuzma
5,781,906 A 7/1998 Aggarwal et al.
5,787,430 A 7/1998 Doeringer et al.
5,787,441 A 7/1998 Beckhardt
5,790,425 A 8/1998 Wagle
5,790,790 A 8/1998 Smith et al.
5,790,974 A 8/1998 Tognazzini
5,793,413 A 8/1998 Hylton et al.
5,794,210 A 8/1998 Goldhaber et al.
5,799,318 A 8/1998 Cardinal et al.
5,802,312 A 9/1998 Lazaridis et al.
5,802,454 A 9/1998 Goshay et al.
5,802,518 A 9/1998 Karaev et al.
5,802,524 A 9/1998 Flowers et al.
5,806,074 A 9/1998 Souder et al.
5,809,242 A 9/1998 Shaw et al.
5,809,415 A 9/1998 Rossmann
5,818,437 A 10/1998 Grover et al.
5,819,172 A 10/1998 Campana, Jr. et al.
5,819,274 A 10/1998 Jackson, Jr.
5,819,284 A 10/1998 Farber et al.
5,822,324 A 10/1998 Kostresti et al.
5,822,747 A 10/1998 Graefe et al.
5,826,269 A 10/1998 Hussey
5,831,664 A 11/1998 Wharton et al.
5,832,483 A 11/1998 Barker
5,832,489 A 11/1998 Kucala
5,832,500 A 11/1998 Burrows
5,835,087 A 11/1998 Herz et al.
5,835,722 A 11/1998 Bradshaw et al.
5,838,252 A 11/1998 Kikinis
5,838,768 A 11/1998 Sumar et al.
5,838,973 A 11/1998 Carpenter-Smith et al.
5,845,278 A 12/1998 Kirsch et al.
5,852,775 A 12/1998 Hidary
5,852,820 A 12/1998 Burrows
5,857,201 A 1/1999 Wright, Jr. et al.
5,862,223 A 1/1999 Walker et al.
5,867,665 A 2/1999 Butman et al.
5,867,817 A 2/1999 Catallo et al.
5,870,759 A 2/1999 Bauer et al.
5,884,323 A 3/1999 Hawkins et al.
5,889,845 A 3/1999 Staples et al.
5,890,147 A 3/1999 Peltonen et al.
5,892,909 A 4/1999 Grasso et al.
5,898,780 A 4/1999 Liu et al.
5,898,917 A 4/1999 Batni et al.
5,903,723 A 5/1999 Beck et al.
5,907,618 A 5/1999 Gennaro et al. ..... 380/286
5,909,689 A 6/1999 Van Ryzin
5,913,032 A 6/1999 Schwartz et al.
5,924,096 A 7/1999 Draper et al.
5,928,325 A 7/1999 Shaughnessy et al.
5,928,329 A 7/1999 Clark et al.
5,937,161 A 8/1999 Mulligan et al.
5,940,813 A 8/1999 Hutchings
5,943,676 A 8/1999 Boothby
5,948,066 A 9/1999 Whalen et al.
5,951,636 A 9/1999 Zerber
5,960,394 A 9/1999 Gould et al.
5,960,406 A 9/1999 Rasansky et al.
5,961,590 A 10/1999 Mendez et al.
5,963,642 A 10/1999 Goldstein
5,964,833 A 10/1999 Kikinis
5,968,131 A 10/1999 Mendez et al.
5,974,238 A 10/1999 Chase, Jr.
5,974,327 A 10/1999 Agrawal et al.
5,978,837 A 11/1999 Foladare et al.

(56) References Cited

U.S. PATENT DOCUMENTS 5,978,933 A 11/1999 Wyld et al.
5,987,440 A 11/1999 O'Neil et al.
6,000,000 A 12/1999 Hawkins et al.
6,003,070 A 12/1999 Frantz
6,006,274 A 12/1999 Hawkins et al.
6,016,478 A 1/2000 Zhang et al.
6,016,520 A 1/2000 Facq et al.
6,018,762 A 1/2000 Brunson et al.
6,023,700 A 2/2000 Owens et al.
6,023,708 A 2/2000 Mendez et al.
6,029,238 A 2/2000 Furukawa
6,034,621 A 3/2000 Kaufman
6,035,104 A 3/2000 Zahariev
6,044,372 A 3/2000 Rothfus et al.
6,044,381 A 3/2000 Mendez et al.
6,047,051 A 4/2000 Ginzboorog et al.
6,047,327 A 4/2000 Tso et al.
6,052,563 A 4/2000 Macko
6,052,735 A 4/2000 Ulrich et al.
6,057,855 A 5/2000 Barkans
6,065,055 A 5/2000 Hughes et al.
6,073,138 A 6/2000 de l'Etraz et al.
6,073,142 A 6/2000 Geiger et al.
6,073,165 A 6/2000 Narasimhan et al.
6,085,166 A 7/2000 Beckhardt et al.
6,085,192 A 7/2000 Mendez et al.
6,088,677 A 7/2000 Spurgeon
6,101,320 A 8/2000 Schuetze et al.
6,101,480 A 8/2000 Conmy et al.
6,101,531 A 8/2000 Eggleston et al.
6,112,181 A 8/2000 Shear et al.
6,119,014 A 9/2000 Alperovich et al.
6,119,171 A 9/2000 Alkhatib
6,125,369 A 9/2000 Wu et al.
6,125,388 A 9/2000 Reisman
6,128,627 A 10/2000 Mattis et al.
6,130,898 A 10/2000 Kostreski et al.
6,131,096 A 10/2000 Ng et al.
6,131,116 A 10/2000 Riggins et al.
6,134,432 A 10/2000 Holmes et al.
6,138,013 A * 10/2000 Blanchard et al. ..... 455/428
6,138,124 A 10/2000 Beckhardt
6,138,128 A 10/2000 Perkowitz et al.
6,138,146 A 10/2000 Moon et al.
6,141,664 A 10/2000 Boothby
6,151,606 A 11/2000 Mendez
6,157,630 A 12/2000 Adler et al.
6,161,140 A 12/2000 Moriya
6,167,379 A 12/2000 Dean et al.
6,167,435 A 12/2000 Druckenmiller et al.
6,170,014 B1 1/2001 Darago et al.
6,173,312 B1 1/2001 Atarashi et al.
6,173,446 B1 1/2001 Khan et al.
6,175,831 B1 1/2001 Weinreich et al.
6,178,419 B1 1/2001 Legh-Smith et al.
6,181,935 B1 1/2001 Gossman et al.
6,185,184 B1 2/2001 Mattaway et al.
6,195,533 B1 2/2001 Tkatch et al.
6,198,696 B1 3/2001 Korpi et al.
6,198,922 B1 3/2001 Baynham
6,201,469 B1 3/2001 Balch et al.
6,202,085 B1 3/2001 Benson et al.
6,205,448 B1 3/2001 Kruglikov et al.
6,212,529 B1 4/2001 Boothby et al.
6,219,694 B1 4/2001 Lazaridis et al.
6,221,877 B1 4/2001 Aronov et al.
6,223,187 B1 4/2001 Boothby et al.
6,226,686 B1 5/2001 Rothschild et al.
6,233,341 B1 5/2001 Riggins
6,243,705 B1 6/2001 Kucala
6,246,875 B1 6/2001 Seazholtz et al.
6,247,135 B1 6/2001 Feague
6,249,808 B1 6/2001 Seshadri
6,256,666 B1 7/2001 Singhal
6,263,201 B1 7/2001 Hashimoto et al.
6,263,340 B1 7/2001 Green
6,269,369 B1 7/2001 Robertson
6,272,545 B1 8/2001 Flanagin et al.
6,275,850 B1 8/2001 Beyda et al.
6,275,858 B1 8/2001 Bates et al.
6,286,099 B1 * 9/2001 Kramer ..... 713/172
6,289,212 B1 9/2001 Stein et al.
6,289,214 B1 9/2001 Backstrom
6,292,904 B1 9/2001 Broomhall et al.
6,295,541 B1 9/2001 Bodnar et al.
6,300,947 B1 10/2001 Kanevsky
6,304,881 B1 10/2001 Halim et al.
6,308,201 B1 10/2001 Pivowar et al.
6,317,594 B1 11/2001 Grossman et al.
6,320,943 B1 11/2001 Borland
6,324,541 B1 11/2001 de l'Etraz et al.
6,324,542 B1 11/2001 Wright, Jr. et al.
6,324,544 B1 11/2001 Alam et al.
6,324,587 B1 11/2001 Trenbeath et al.
6,327,586 B1 12/2001 Kisiel
6,336,117 B1 1/2002 Massarani
6,336,138 B1 1/2002 Caswell et al.
6,351,767 B1 2/2002 Batchelder et al.
6,356,937 B1 3/2002 Montville et al.
6,363,051 B1 3/2002 Eslambolchi et al.
6,363,352 B1 3/2002 Dailey et al.
6,370,566 B2 4/2002 Discolo et al.
6,377,810 B1 4/2002 Geiger et al.
6,380,959 B1 4/2002 Wang et al.
6,389,422 B1 5/2002 Doi et al.
6,389,455 B1 5/2002 Fuisz
6,389,457 B2 5/2002 Lazaridis et al.
6,397,057 B1 5/2002 Malackowski et al.
6,397,230 B1 5/2002 Carmel et al.
6,401,104 B1 6/2002 LaRue et al.
6,401,112 B1 6/2002 Boyer et al.
6,401,113 B2 6/2002 Lazaridis et al.
6,405,197 B2 6/2002 Gilmour
6,411,696 B1 6/2002 Iverson et al.
6,415,031 B1 7/2002 Colligan et al.
6,418,308 B1 7/2002 Heinonen et al.
6,421,669 B1 7/2002 Gilmour et al.
6,421,781 B1 7/2002 Fox et al.
6,430,602 B1 8/2002 Kay et al.
6,438,585 B2 8/2002 Mousseau et al.
6,438,612 B1 8/2002 Ylonen et al.
6,442,589 B1 8/2002 Takahashi et al.
6,442,637 B1 8/2002 Hawkins et al.
6,446,118 B1 9/2002 Gottlieb
6,463,463 B1 10/2002 Godfrey et al.
6,463,464 B1 10/2002 Lazaridis et al.
6,487,557 B1 11/2002 Nagatomo
6,487,560 B1 11/2002 LaRue et al.
6,490,353 B1 12/2002 Tan
6,496,802 B1 12/2002 van Zoest et al.
6,499,054 B1 12/2002 Hesselink et al.
6,505,214 B1 1/2003 Sherman et al.
6,516,327 B1 2/2003 Zondervan et al.
6,526,433 B1 2/2003 Chang et al.
6,526,506 B1 2/2003 Lewis
6,529,908 B1 3/2003 Piett et al.
6,532,446 B1 3/2003 King
6,535,892 B1 3/2003 LaRue et al.
6,546,005 B1 4/2003 Berkley et al.
6,549,939 B1 4/2003 Ford et al.
6,556,217 B1 4/2003 Mäkipää et al.
6,593,944 B1 7/2003 Nicolas et al.
6,601,026 B2 7/2003 Appelt et al.
6,615,253 B1 9/2003 Bowman-Amuah
6,618,710 B1 9/2003 Zondervan et al.
6,621,892 B1 9/2003 Banister et al.
6,625,621 B2 9/2003 Tan et al.
6,636,482 B2 10/2003 Cloonan et al.
6,639,693 B1 10/2003 Ejiri et al.
6,640,097 B2 10/2003 Corrigan et al.
6,640,244 B1 10/2003 Bowman-Amuah
6,640,249 B1 10/2003 Bowman-Amuah
6,643,650 B1 11/2003 Slaughter et al.
6,643,688 B1 11/2003 Fuisz

(56) References Cited

U.S. PATENT DOCUMENTS 6,647,384 B2 11/2003 Gilmour
6,650,890 B1 11/2003 Irlam et al.
6,662,016 B1 12/2003 Buckham et al.
6,668,046 B1 12/2003 Albal
6,671,695 B2 12/2003 McFadden
6,671,700 B1 12/2003 Creemer et al.
6,671,702 B2 12/2003 Kruglikov et al.
6,671,757 B1 12/2003 Multer et al.
6,694,336 B1 2/2004 Multer et al.
6,697,807 B2 2/2004 McGeachie
6,701,378 B1 3/2004 Gilhuly et al.
6,707,801 B2 3/2004 Hsu
6,708,221 B1 3/2004 Mendez et al.
6,714,965 B2 3/2004 Kakuta et al.
6,721,787 B1 4/2004 Hiscock
6,727,917 B1 4/2004 Chew et al.
6,728,530 B1 4/2004 Heinonen et al.
6,728,786 B2 4/2004 Hawkins et al.
6,732,101 B1 5/2004 Cook
6,732,158 B1 5/2004 Hesselink et al.
6,735,591 B2 5/2004 Khan
6,741,232 B1 5/2004 Siedlikowski et al.
6,741,855 B1 5/2004 Martin et al.
6,742,015 B1 5/2004 Bowman-Amuah
6,742,059 B1 5/2004 Todd et al.
6,745,024 B1 6/2004 DeJaco et al.
6,745,326 B1 6/2004 Wary
6,756,882 B2 6/2004 Benes et al.
6,757,362 B1 6/2004 Cooper et al.
6,757,696 B2 6/2004 Multer et al.
6,757,708 B1 6/2004 Craig et al.
6,760,916 B2 7/2004 Holtz et al.
6,771,294 B1 8/2004 Pulli et al.
6,775,362 B1 8/2004 Ransom
6,779,019 B1 8/2004 Mousseau et al.
6,782,409 B1 8/2004 Yoshida
6,785,868 B1 8/2004 Raff
6,785,906 B1 8/2004 Gaughan et al.
6,799,190 B1 9/2004 Boothby
6,804,707 B1 10/2004 Ronning
6,816,849 B1 11/2004 Halt, Jr.
6,820,088 B1 11/2004 Hind et al.
6,820,204 B1 11/2004 Desai et al.
6,829,487 B2 12/2004 Eiden et al.
6,834,195 B2 12/2004 Brandenberg et al.
6,847,974 B2 1/2005 Wachtel
6,850,757 B2 2/2005 Watanabe et al.
6,859,212 B2 2/2005 Kumar et al.
6,859,440 B1 2/2005 Sonti et al.
6,867,774 B1 3/2005 Halmshaw et al.
6,868,447 B1 3/2005 Slaughter et al.
6,871,220 B1 3/2005 Rajan et al.
6,871,236 B2 3/2005 Fishman et al.
6,873,688 B1 3/2005 Aarnio
6,874,017 B1 3/2005 Inoue et al.
6,879,985 B2 4/2005 Deguchi et al.
6,886,030 B1 4/2005 Easterbrook et al.
6,892,070 B2 5/2005 Warrier et al.
6,892,196 B1 5/2005 Hughes
6,895,394 B1 5/2005 Kremer et al.
6,895,558 B1 5/2005 Loveland
6,898,427 B1 5/2005 Griffith et al.
6,922,547 B2 7/2005 O'Neill et al.
6,922,721 B1 7/2005 Minborg et al.
6,925,477 B1 8/2005 Champagne et al.
6,931,529 B2 8/2005 Kunzinger
6,938,079 B1 8/2005 Anderson et al.
6,944,447 B2 9/2005 Portman et al.
6,944,662 B2 9/2005 Devine et al.
6,947,770 B2 9/2005 Rydbeck
6,950,862 B1 * 9/2005 Puthiyandyil et al. ..... 709/220
6,957,397 B1 10/2005 Hawkins et al.
6,965,917 B1 11/2005 Aloni et al.
6,966,058 B2 11/2005 Earl et al.
6,968,175 B2 11/2005 Raivisto et al.
6,970,879 B1 11/2005 Gilmour
6,972,682 B2 12/2005 Lareau et al.
6,973,299 B2 12/2005 Apfel
6,981,041 B2 12/2005 Araujo et al.
6,981,047 B2 12/2005 Hanson et al.
6,985,933 B1 1/2006 Singhal et al.
6,985,983 B2 1/2006 Pellegrino et al.
6,986,061 B1 1/2006 Kunzinger
6,987,734 B2 1/2006 Hundemer
6,990,472 B2 1/2006 Rosenhaft et al.
6,993,326 B2 1/2006 Link, II et al.
6,993,327 B2 1/2006 Mathis
6,996,627 B1 2/2006 Carden
6,999,753 B2 2/2006 Beckmann et al.
7,020,685 B1 3/2006 Chen et al.
7,024,491 B1 4/2006 Hanmann et al.
7,026,984 B1 4/2006 Thandu et al.
7,032,242 B1 4/2006 Grabelsky et al.
7,035,630 B2 4/2006 Knowles
7,046,993 B2 5/2006 Haaramo et al.
7,047,202 B2 5/2006 Jaipuria et al.
7,062,024 B2 6/2006 Kreckel et al.
7,069,308 B2 6/2006 Abrams
7,072,678 B2 7/2006 Allison
7,079,499 B1 7/2006 Akhtar et al.
7,080,371 B1 7/2006 Arnaiz et al.
7,082,316 B2 7/2006 Eiden et al.
7,085,365 B2 8/2006 Kauppinen
7,096,030 B2 8/2006 Huomo
7,100,821 B2 9/2006 Rasti
7,103,432 B2 9/2006 Drader et al.
7,120,692 B2 10/2006 Hesselink et al.
7,120,928 B2 10/2006 Sheth et al.
7,130,839 B2 10/2006 Boreham et al.
7,136,645 B2 11/2006 Hanson et al.
7,139,555 B2 11/2006 Apfel
7,139,565 B2 11/2006 Fiatal et al.
7,140,549 B2 11/2006 de Jong
7,146,645 B1 12/2006 Hellsten et al.
7,149,780 B2 12/2006 Quine et al.
7,149,789 B2 12/2006 Slivka et al.
7,149,959 B1 12/2006 Jones et al.
7,162,241 B2 1/2007 Kim et al.
7,165,727 B2 1/2007 de Jong
7,172,118 B2 2/2007 Urken
7,181,228 B2 2/2007 Boesch
7,184,790 B2 2/2007 Dorenbosch et al.
7,185,362 B2 2/2007 Hawkes et al.
7,194,273 B2 3/2007 Vaudreuil
7,200,390 B1 4/2007 Henager et al.
7,203,733 B1 4/2007 Bern
7,206,806 B2 4/2007 Pineau
7,209,757 B2 4/2007 Naghian et al.
7,210,121 B2 4/2007 Xia et al.
7,219,139 B2 5/2007 Martin et al.
7,219,222 B1 5/2007 Durbin et al.
7,224,957 B2 5/2007 Spector
7,231,206 B2 6/2007 Cudak et al.
7,233,795 B1 6/2007 Ryden
7,234,111 B2 6/2007 Chu et al.
7,239,877 B2 7/2007 Corneille et al.
7,240,095 B1 7/2007 Lewis
7,242,680 B2 7/2007 Gallant
7,245,926 B2 7/2007 Liao et al.
7,257,391 B2 8/2007 Burgess et al.
7,257,639 B1 8/2007 Li et al.
7,259,666 B1 8/2007 Hermsmeyer et al.
7,260,552 B2 8/2007 Riera Jorba et al.
7,260,590 B1 8/2007 Williams
7,260,651 B2 8/2007 Parrella, Sr. et al.
7,272,830 B2 9/2007 de Jong
7,277,408 B2 10/2007 Sorsa
7,284,664 B1 10/2007 Ivchenko et al.
7,289,792 B1 10/2007 Turunen
7,289,964 B1 10/2007 Bowman-Amuah
7,289,971 B1 10/2007 O'Neil et al.
7,293,107 B1 11/2007 Hanson et al.
7,295,853 B2 11/2007 Jin et al.
7,296,155 B1 11/2007 Trostle et al.

(56) References Cited

U.S. PATENT DOCUMENTS

| | | | |
|---|---|---|---|
| 7,305,252 | B2 | 12/2007 | Britt et al. |
| 7,305,700 | B2 | 12/2007 | Boynton et al. |
| 7,310,350 | B1 | 12/2007 | Shao et al. |
| 7,310,729 | B2 | 12/2007 | Gordon et al. |
| 7,324,473 | B2 | 1/2008 | Corneille et al. |
| 7,349,871 | B2 | 3/2008 | Labrou et al. |
| 7,353,274 | B1 | 4/2008 | Rouhi et al. |
| 7,359,720 | B2 | 4/2008 | Hartmaier et al. |
| 7,373,386 | B2 | 5/2008 | Gardner et al. |
| 7,374,099 | B2 | 5/2008 | de Jong |
| 7,376,701 | B2 | 5/2008 | Bhargava et al. |
| 7,382,879 | B1 | 6/2008 | Miller |
| 7,388,950 | B2 | 6/2008 | Elsey et al. |
| 7,389,412 | B2 | 6/2008 | Sharma et al. |
| 7,392,483 | B2 | 6/2008 | Wong et al. |
| 7,395,329 | B1 | 7/2008 | Holt et al. |
| 7,398,271 | B1 | 7/2008 | Borkovsky et al. |
| 7,430,609 | B2 | 9/2008 | Brown et al. |
| 7,441,271 | B2 | 10/2008 | Fiatal et al. |
| 7,443,847 | B1 | 10/2008 | Albert et al. |
| 7,461,071 | B2 | 12/2008 | Fitzpatrick et al. |
| 7,465,231 | B2 | 12/2008 | Lewin et al. |
| 7,469,125 | B2 | 12/2008 | Nurmi |
| 7,483,036 | B2 | 1/2009 | Moore |
| 7,499,537 | B2 | 3/2009 | Elsey et al. |
| 7,502,615 | B2 | 3/2009 | Wilhoite et al. |
| 7,519,042 | B2 | 4/2009 | Gorday et al. |
| 7,532,571 | B1 | 5/2009 | Price et al. |
| 7,539,665 | B2 | 5/2009 | Mendez |
| 7,539,728 | B2 | 5/2009 | Perepa et al. |
| 7,548,947 | B2 | 6/2009 | Karsriel et al. |
| 7,548,969 | B2 | 6/2009 | Tripp et al. |
| 7,551,900 | B2 | 6/2009 | Kang et al. |
| 7,567,575 | B2 | 7/2009 | Chen et al. |
| 7,574,208 | B2 | 8/2009 | Hanson et al. |
| 7,575,171 | B2 | 8/2009 | Lev |
| 7,584,294 | B2 | 9/2009 | Plamondon |
| 7,587,482 | B2 | 9/2009 | Henderson et al. |
| 7,587,608 | B2 | 9/2009 | Haller et al. |
| 7,593,714 | B2 | 9/2009 | Schultz et al. |
| 7,596,608 | B2 | 9/2009 | Alexander et al. |
| 7,596,791 | B2 | 9/2009 | Wei et al. |
| 7,613,792 | B2 | 11/2009 | Zervas et al. |
| 7,630,986 | B1 | 12/2009 | Herz et al. |
| 7,634,558 | B1 | 12/2009 | Mangal et al. |
| 7,643,818 | B2 | 1/2010 | Backholm et al. |
| 7,644,166 | B2 | 1/2010 | Appelman et al. |
| 7,650,416 | B2 | 1/2010 | Wu et al. |
| 7,672,291 | B2 | 3/2010 | Wang |
| 7,672,439 | B2 | 3/2010 | Appelman et al. |
| 7,680,281 | B2 | 3/2010 | Fiatal et al. |
| 7,684,346 | B2 | 3/2010 | Valli |
| 7,689,664 | B2 | 3/2010 | Karlberg |
| 7,693,555 | B2 | 4/2010 | Srinivasan et al. |
| 7,693,944 | B2 | 4/2010 | Appelman et al. |
| 7,694,008 | B2 | 4/2010 | Chang et al. |
| 7,706,781 | B2 | 4/2010 | Backholm et al. |
| 7,707,573 | B1 | 4/2010 | Marmaros et al. |
| 7,752,633 | B1 | 7/2010 | Fleming |
| 7,757,956 | B2 | 7/2010 | Koenck et al. |
| 7,769,395 | B2 | 8/2010 | Fiatal et al. |
| 7,769,400 | B2 | 8/2010 | Backholm et al. |
| 7,769,805 | B1 | 8/2010 | Barnes et al. |
| 7,778,792 | B2 | 8/2010 | Huang et al. |
| 7,783,757 | B2 | 8/2010 | Plamondon |
| 7,796,742 | B1 | 9/2010 | Sutaria et al. |
| 7,797,064 | B2 | 9/2010 | Loomis et al. |
| 7,809,818 | B2 | 10/2010 | Plamondon |
| 7,827,055 | B1 | 11/2010 | Snodgrass et al. |
| 7,827,597 | B2 | 11/2010 | Boynton et al. |
| 7,853,563 | B2 | 12/2010 | Alvarado et al. |
| 7,877,703 | B1 | 1/2011 | Fleming |
| 7,881,745 | B1 | 2/2011 | Rao et al. |
| 7,899,996 | B1 | 3/2011 | Levin-Michael |
| 7,908,656 | B1 | 3/2011 | Mu |
| 7,917,468 | B2 | 3/2011 | Ariel et al. |
| 7,917,505 | B2 | 3/2011 | van Gent et al. |
| 7,921,167 | B2 | 4/2011 | Shroff et al. |
| 7,930,416 | B2 | 4/2011 | Miller et al. |
| 7,933,929 | B1 | 4/2011 | McClendon et al. |
| 7,937,091 | B2 | 5/2011 | Roman et al. |
| 7,970,860 | B2 | 6/2011 | Kline et al. |
| 7,996,487 | B2 | 8/2011 | Snyder |
| 8,005,891 | B2 | 8/2011 | Knowles et al. |
| 8,010,082 | B2 | 8/2011 | Sutaria et al. |
| 8,032,409 | B1 | 10/2011 | Mikurak |
| 8,064,583 | B1 | 11/2011 | Sutaria et al. |
| 8,069,166 | B2 | 11/2011 | Alvarado et al. |
| 8,078,158 | B2 | 12/2011 | Backholm |
| 8,107,921 | B2 | 1/2012 | Fiatal |
| 8,116,214 | B2 | 2/2012 | Backholm et al. |
| 8,127,342 | B2 | 2/2012 | Boynton et al. |
| 8,166,164 | B1 | 4/2012 | Luna et al. |
| 8,190,701 | B2 | 5/2012 | Luna et al. |
| 8,194,680 | B1 | 6/2012 | Brandwine et al. |
| 8,204,953 | B2 | 6/2012 | Luna et al. |
| 8,209,709 | B2 | 6/2012 | Fleming |
| 8,260,852 | B1 | 9/2012 | Cselle |
| 8,549,587 | B2 | 10/2013 | Boynton et al. |
| 2001/0009025 | A1 | 7/2001 | Ahonen |
| 2001/0010046 | A1 | 7/2001 | Muyres et al. |
| 2001/0013069 | A1 | 8/2001 | Shah |
| 2001/0023414 | A1 | 9/2001 | Kumar et al. |
| 2001/0029524 | A1 | 10/2001 | Smith et al. |
| 2001/0032254 | A1 | 10/2001 | Hawkins et al. |
| 2001/0034225 | A1 | 10/2001 | Gupte et al. |
| 2001/0034244 | A1 | 10/2001 | Calder et al. |
| 2001/0037453 | A1* | 11/2001 | Mitty et al. ..... 713/168 |
| 2001/0039191 | A1 | 11/2001 | Maierhofer |
| 2001/0041566 | A1 | 11/2001 | Xanthos et al. |
| 2001/0042009 | A1 | 11/2001 | Montague |
| 2001/0042099 | A1 | 11/2001 | Peng |
| 2001/0043148 | A1 | 11/2001 | Stewart |
| 2001/0052052 | A1 | 12/2001 | Peng |
| 2001/0053687 | A1 | 12/2001 | Sivula |
| 2002/0002478 | A1 | 1/2002 | Swart et al. |
| 2002/0002591 | A1 | 1/2002 | Ketola |
| 2002/0007303 | A1 | 1/2002 | Brookler et al. |
| 2002/0013727 | A1 | 1/2002 | Lee |
| 2002/0019225 | A1 | 2/2002 | Miyashita |
| 2002/0019812 | A1 | 2/2002 | Board et al. |
| 2002/0035556 | A1 | 3/2002 | Shah et al. |
| 2002/0035617 | A1 | 3/2002 | Lynch et al. |
| 2002/0038253 | A1 | 3/2002 | Seaman et al. |
| 2002/0042875 | A1 | 4/2002 | Shukla |
| 2002/0049818 | A1 | 4/2002 | Gilhuly et al. |
| 2002/0049828 | A1 | 4/2002 | Pekarek-Kostka |
| 2002/0053078 | A1 | 5/2002 | Holtz et al. |
| 2002/0055351 | A1 | 5/2002 | Elsey et al. |
| 2002/0059201 | A1 | 5/2002 | Work |
| 2002/0059457 | A1 | 5/2002 | Ballard et al. |
| 2002/0068559 | A1 | 6/2002 | Sharma et al. |
| 2002/0073207 | A1 | 6/2002 | Widger et al. |
| 2002/0077077 | A1 | 6/2002 | Rezvani et al. |
| 2002/0077084 | A1 | 6/2002 | Zellner et al. |
| 2002/0078384 | A1 | 6/2002 | Hippelainen |
| 2002/0087549 | A1 | 7/2002 | Mostafa |
| 2002/0087679 | A1 | 7/2002 | Pulley et al. |
| 2002/0087883 | A1 | 7/2002 | Wohlgemuth et al. |
| 2002/0089542 | A1 | 7/2002 | Imamura |
| 2002/0091921 | A1 | 7/2002 | Kunzinger |
| 2002/0095319 | A1 | 7/2002 | Swart et al. |
| 2002/0095328 | A1 | 7/2002 | Swart et al. |
| 2002/0095391 | A1 | 7/2002 | Swart et al. |
| 2002/0095399 | A1 | 7/2002 | Devine et al. |
| 2002/0098855 | A1 | 7/2002 | Hartmaier et al. |
| 2002/0099613 | A1 | 7/2002 | Swart et al. |
| 2002/0099809 | A1 | 7/2002 | Lee |
| 2002/0101975 | A1 | 8/2002 | Tiburtius et al. |
| 2002/0103934 | A1 | 8/2002 | Fishman et al. |
| 2002/0107944 | A1 | 8/2002 | Bai et al. |
| 2002/0107985 | A1 | 8/2002 | Hwang et al. |
| 2002/0116499 | A1 | 8/2002 | Ennus et al. |
| 2002/0116501 | A1 | 8/2002 | Ho et al. |

(56) References Cited

U.S. PATENT DOCUMENTS

2002/0120388 A1 8/2002 Bullock
2002/0120766 A1 8/2002 Okajima et al.
2002/0120779 A1 8/2002 Teeple et al.
2002/0126701 A1 9/2002 Requena
2002/0133504 A1 9/2002 Vlahos et al.
2002/0144109 A1 10/2002 Benantar et al.
2002/0146129 A1 10/2002 Kaplan
2002/0152379 A1 10/2002 Gefwert et al.
2002/0155848 A1 10/2002 Suryanarayana
2002/0156839 A1 10/2002 Peterson et al.
2002/0158908 A1 10/2002 Vaajala et al.
2002/0161587 A1 10/2002 Pitts, III et al.
2002/0161925 A1 10/2002 Munger et al.
2002/0161928 A1 10/2002 Ndili
2002/0164977 A1 11/2002 Link, II et al.
2002/0167484 A1 11/2002 Hatanaka et al.
2002/0174189 A1 11/2002 Peng
2002/0186848 A1 12/2002 Shaik
2002/0188940 A1 12/2002 Breckner et al.
2002/0193094 A1 12/2002 Lawless et al.
2002/0194209 A1 12/2002 Bolosky et al.
2002/0198027 A1 12/2002 Rydbeck
2003/0005151 A1 1/2003 Ullman et al.
2003/0014491 A1 1/2003 Horvitz et al.
2003/0022662 A1 1/2003 Mittal
2003/0023692 A1 1/2003 Moroo
2003/0023975 A1 1/2003 Schrader et al.
2003/0028430 A1 2/2003 Zimmerman
2003/0028441 A1 2/2003 Barsness et al.
2003/0046433 A1 3/2003 Luzzatti et al.
2003/0046586 A1 3/2003 Bheemarasetti et al.
2003/0046587 A1 3/2003 Bheemarasetti et al.
2003/0050041 A1 3/2003 Wu
2003/0054810 A1 3/2003 Chen et al.
2003/0056096 A1 3/2003 Albert et al.
2003/0060188 A1 3/2003 Gidron et al.
2003/0063120 A1 4/2003 Wong et al.
2003/0065738 A1 4/2003 Yang et al.
2003/0065739 A1 4/2003 Shnier
2003/0065802 A1 4/2003 Vitikainen et al.
2003/0070061 A1 4/2003 Wong et al.
2003/0072451 A1 4/2003 Pimentel et al.
2003/0078880 A1 4/2003 Alley et al.
2003/0084165 A1 5/2003 Kjellberg et al.
2003/0088629 A1 5/2003 Berkowitz et al.
2003/0093691 A1 5/2003 Simon et al.
2003/0097381 A1 5/2003 Detweiler et al.
2003/0100321 A1 5/2003 Rao et al.
2003/0100326 A1 5/2003 Grube et al.
2003/0117432 A1 6/2003 Kautto-Kiovula et al.
2003/0120685 A1 6/2003 Duncombe et al.
2003/0125023 A1 7/2003 Fishler
2003/0126216 A1 7/2003 Avila et al.
2003/0130984 A1 7/2003 Quinlan et al.
2003/0145038 A1 7/2003 Bin Tariq et al.
2003/0146934 A1 8/2003 Bailey et al.
2003/0153338 A1 8/2003 Herz et al.
2003/0154212 A1 8/2003 Schirmer et al.
2003/0156146 A1 8/2003 Suomela et al.
2003/0157947 A1 8/2003 Fiatal et al.
2003/0169262 A1 9/2003 Lavelle et al.
2003/0177281 A1 9/2003 McQuillan et al.
2003/0182431 A1 9/2003 Sturniolo et al.
2003/0187984 A1 10/2003 Banavar et al.
2003/0204605 A1 10/2003 Hudson et al.
2003/0208529 A1 11/2003 Pendyala et al.
2003/0208559 A1 11/2003 Velline et al.
2003/0210666 A1 11/2003 Trossen et al.
2003/0211845 A1 11/2003 Lohtia et al.
2003/0217098 A1 11/2003 Bobde et al.
2003/0217142 A1 11/2003 Bobde et al.
2003/0223554 A1 12/2003 Zhang
2003/0227487 A1 12/2003 Hugh
2003/0227745 A1 12/2003 Khoo
2003/0235308 A1 12/2003 Boynton et al.
2003/0236857 A1 12/2003 Takase et al.
2003/0236981 A1 12/2003 Marmigere et al.
2004/0002324 A1 1/2004 Juntunen et al.
2004/0006630 A1 1/2004 Friend et al.
2004/0015504 A1 1/2004 Ahad et al.
2004/0024795 A1 2/2004 Hind et al.
2004/0024824 A1 2/2004 Ferguson et al.
2004/0024892 A1 2/2004 Creswell et al.
2004/0027326 A1 2/2004 Hays et al.
2004/0027375 A1 2/2004 Ellis et al.
2004/0027378 A1 2/2004 Hays et al.
2004/0043770 A1 3/2004 Amit et al.
2004/0049579 A1 3/2004 Ims et al.
2004/0049599 A1 3/2004 Friend et al.
2004/0051715 A1 3/2004 Brokenshire et al.
2004/0054719 A1 3/2004 Daigle et al.
2004/0054739 A1 3/2004 Friend et al.
2004/0064445 A1 4/2004 Pfleging et al.
2004/0064488 A1 4/2004 Sinha
2004/0068579 A1 4/2004 Marmigere et al.
2004/0068698 A1 4/2004 Wu et al.
2004/0073476 A1 4/2004 Donahue et al.
2004/0073651 A1 4/2004 Beaulieu et al.
2004/0075675 A1 4/2004 Raivisto et al.
2004/0075695 A1 4/2004 Chew et al.
2004/0078814 A1 4/2004 Allen
2004/0080515 A1 4/2004 Hagiwara
2004/0082346 A1 4/2004 Skytt et al.
2004/0098625 A1 5/2004 Lagadec et al.
2004/0103147 A1 5/2004 Flesher et al.
2004/0107319 A1 6/2004 D'Orto et al.
2004/0110497 A1 6/2004 Little
2004/0120323 A1 6/2004 Viikari et al.
2004/0123095 A1 6/2004 Marshall
2004/0123304 A1 6/2004 Black et al.
2004/0127214 A1 7/2004 Reddy et al.
2004/0128375 A1 7/2004 Rockwell
2004/0133626 A1 7/2004 Herrero et al.
2004/0141011 A1 7/2004 Smethers et al.
2004/0147248 A1 7/2004 Will
2004/0147262 A1 7/2004 Lescuyer et al.
2004/0148375 A1 7/2004 Levett et al.
2004/0158611 A1 8/2004 Daniell et al.
2004/0167966 A1 8/2004 Lee et al.
2004/0170257 A1 9/2004 Gross et al.
2004/0172481 A1 9/2004 Engstrom
2004/0176128 A1 9/2004 Grabelsky et al.
2004/0177369 A1 9/2004 Akins, III
2004/0179513 A1 9/2004 Smith et al. ..... 370/352
2004/0181550 A1 9/2004 Warsta et al.
2004/0184475 A1 9/2004 Meier
2004/0186902 A1 9/2004 Stewart
2004/0189610 A1 9/2004 Friend
2004/0199497 A1 10/2004 Timmons
2004/0199582 A1 10/2004 Kucharewski et al.
2004/0199663 A1 10/2004 Horvitz et al.
2004/0205248 A1 10/2004 Little et al.
2004/0205330 A1 10/2004 Godfrey et al.
2004/0209602 A1 10/2004 Joyce et al.
2004/0210639 A1 10/2004 Ben-Yoseph et al.
2004/0219940 A1 11/2004 Kong et al.
2004/0230619 A1 11/2004 Blanco et al.
2004/0233930 A1 11/2004 Colby, Jr.
2004/0236792 A1 11/2004 Celik
2004/0242209 A1 12/2004 Kruis et al.
2004/0252816 A1 12/2004 Nicolas
2004/0255126 A1* 12/2004 Reith ..... 713/183
2004/0258231 A1 12/2004 Elsey et al.
2004/0259535 A1 12/2004 Elsey et al.
2004/0259537 A1 12/2004 Ackley
2004/0260948 A1 12/2004 Miyata et al.
2004/0264396 A1 12/2004 Ginzburg et al.
2004/0266364 A1 12/2004 Nguyen et al.
2004/0268148 A1 12/2004 Karjala et al.
2005/0002501 A1 1/2005 Elsey et al.
2005/0002508 A1 1/2005 Elsey et al.
2005/0002509 A1 1/2005 Elsey et al.
2005/0002510 A1 1/2005 Elsey et al.
2005/0010694 A1 1/2005 Ma et al.

(56) References Cited

U.S. PATENT DOCUMENTS

2005/0015432 A1 1/2005 Cohen
2005/0021750 A1 1/2005 Abrams
2005/0022000 A1 1/2005 Inomata et al.
2005/0022182 A1 1/2005 Mittal
2005/0027591 A9 2/2005 Gailey et al.
2005/0027716 A1 2/2005 Apfel
2005/0027869 A1 2/2005 Johnson
2005/0033812 A1 2/2005 McCarthy et al.
2005/0033926 A1 2/2005 Dumont
2005/0037741 A1 2/2005 Gilbert
2005/0038707 A1 2/2005 Roever et al.
2005/0038724 A1 2/2005 Roever et al.
2005/0038863 A1 2/2005 Onyon et al.
2005/0041793 A1 2/2005 Fulton et al.
2005/0044144 A1 2/2005 Malik et al.
2005/0055578 A1 3/2005 Wright et al.
2005/0063544 A1* 3/2005 Uusitalo et al. ..... 380/277
2005/0071489 A1 3/2005 Parupudi et al.
2005/0071674 A1 3/2005 Chou et al.
2005/0073982 A1 4/2005 Corneille et al.
2005/0076136 A1 4/2005 Cho et al.
2005/0076241 A1 4/2005 Appelman
2005/0086540 A1 4/2005 Gunter et al.
2005/0094625 A1 5/2005 Bouat
2005/0097225 A1 5/2005 Glatt et al.
2005/0097570 A1 5/2005 Bomers
2005/0101307 A1 5/2005 Brugge et al.
2005/0102257 A1 5/2005 Onyon et al.
2005/0102328 A1 5/2005 Ring et al.
2005/0102351 A1 5/2005 Jiang et al.
2005/0108427 A1 5/2005 Datta
2005/0117606 A1 6/2005 Kim
2005/0120082 A1 6/2005 Hesselink et al.
2005/0120084 A1 6/2005 Hu et al.
2005/0120181 A1 6/2005 Arunagirinathan et al.
2005/0122333 A1 6/2005 Sumanaweera et al.
2005/0124332 A1 6/2005 Clark et al.
2005/0138111 A1 6/2005 Aton et al.
2005/0138176 A1 6/2005 Singh et al.
2005/0144219 A1 6/2005 Terada
2005/0147130 A1 7/2005 Hurwitz et al.
2005/0154698 A1 7/2005 Ikezawa et al.
2005/0154796 A1 7/2005 Forsyth
2005/0154836 A1 7/2005 Steeley et al.
2005/0155027 A1 7/2005 Wei
2005/0164703 A1 7/2005 Huynh
2005/0164721 A1 7/2005 Eric Yeh et al.
2005/0165909 A1 7/2005 Cromer et al.
2005/0170776 A1 8/2005 Siorpaes
2005/0183143 A1* 8/2005 Anderholm et al. ..... 726/22
2005/0188038 A1 8/2005 Yabe
2005/0193036 A1 9/2005 Phillips et al.
2005/0193096 A1 9/2005 Yu et al.
2005/0198170 A1 9/2005 LaMay et al.
2005/0203966 A1 9/2005 Labrou et al.
2005/0210104 A1 9/2005 Torvinen
2005/0210125 A1 9/2005 Li
2005/0222891 A1 10/2005 Chan et al.
2005/0228812 A1 10/2005 Hansmann et al.
2005/0232295 A1 10/2005 Young
2005/0234860 A1 10/2005 Roever et al.
2005/0235214 A1 10/2005 Shimizu et al.
2005/0246139 A1 11/2005 Rivenbark et al.
2005/0248526 A1 11/2005 Twerdahl et al.
2005/0251555 A1 11/2005 Little, II
2005/0254443 A1 11/2005 Campbell et al.
2005/0262220 A1 11/2005 Ecklund et al.
2005/0273804 A1 12/2005 Preisman
2005/0278307 A1 12/2005 Battagin et al.
2005/0278641 A1 12/2005 Mansour et al.
2005/0278647 A1 12/2005 Leavitt et al.
2005/0288006 A1 12/2005 Apfel
2006/0012672 A1 1/2006 Schrader et al.
2006/0020525 A1 1/2006 Borelli et al.
2006/0020580 A1 1/2006 Dettinger et al.
2006/0020804 A1 1/2006 Schleifer et al.
2006/0020947 A1 1/2006 Hallamaa et al.
2006/0021023 A1 1/2006 Stewart et al.
2006/0022048 A1 2/2006 Johnson
2006/0026580 A1 2/2006 Cabillic et al.
2006/0029062 A1 2/2006 Rao et al.
2006/0029063 A1 2/2006 Rao et al.
2006/0029064 A1 2/2006 Rao et al.
2006/0031114 A1 2/2006 Zommers
2006/0031300 A1 2/2006 Kock et al.
2006/0031365 A1 2/2006 Kay et al.
2006/0031428 A1 2/2006 Wikman
2006/0031785 A1 2/2006 Raciborski
2006/0037071 A1 2/2006 Rao et al.
2006/0046686 A1 3/2006 Hawkins et al.
2006/0047844 A1 3/2006 Deng
2006/0048061 A1 3/2006 Forlenza et al.
2006/0052091 A1 3/2006 Onyon et al.
2006/0052137 A1 3/2006 Randall et al.
2006/0059495 A1 3/2006 Spector
2006/0063544 A1 3/2006 Zhao et al.
2006/0069686 A1 3/2006 Beyda et al.
2006/0069687 A1 3/2006 Cui et al.
2006/0069715 A1 3/2006 Vayssiere
2006/0069742 A1 3/2006 Segre
2006/0069746 A1 3/2006 Davis et al.
2006/0073810 A1 4/2006 Pyhalammi et al.
2006/0074951 A1 4/2006 Beier et al.
2006/0075028 A1 4/2006 Zager et al.
2006/0084410 A1 4/2006 Sutaria et al.
2006/0085503 A1 4/2006 Stoye et al.
2006/0093026 A1 5/2006 Montojo et al.
2006/0093135 A1 5/2006 Fiatal et al.
2006/0099969 A1 5/2006 Staton et al.
2006/0099970 A1 5/2006 Morgan et al.
2006/0112177 A1 5/2006 Barkley et al.
2006/0123042 A1 6/2006 Xie et al.
2006/0132495 A1 6/2006 Anderson
2006/0141962 A1 6/2006 Forbes et al.
2006/0143464 A1 6/2006 Ananthanarayanan et al.
2006/0149591 A1 7/2006 Hauf et al.
2006/0149843 A1 7/2006 Rhoads et al.
2006/0149970 A1 7/2006 Imazu
2006/0155822 A1 7/2006 Yang et al.
2006/0161621 A1 7/2006 Rosenberg
2006/0165226 A1 7/2006 Ernst et al.
2006/0167969 A1 7/2006 Andreev et al.
2006/0168043 A1 7/2006 Eisenberger et al.
2006/0168164 A1 7/2006 Lemson
2006/0179410 A1 8/2006 Deeds
2006/0188864 A1 8/2006 Shah
2006/0190428 A1 8/2006 Jung et al.
2006/0190569 A1 8/2006 Neil et al.
2006/0190984 A1 8/2006 Heard et al.
2006/0192014 A1 8/2006 Hamilton et al.
2006/0195570 A1 8/2006 Zellner et al.
2006/0209842 A1 9/2006 Creamer et al.
2006/0212531 A1 9/2006 Kikkawa et al.
2006/0224629 A1 10/2006 Alexander et al.
2006/0230394 A1 10/2006 Forth et al.
2006/0240804 A1 10/2006 Backholm et al.
2006/0240805 A1 10/2006 Backholm et al.
2006/0242137 A1 10/2006 Shah et al.
2006/0242210 A1 10/2006 Ring et al.
2006/0242320 A1 10/2006 Nettle et al.
2006/0242607 A1 10/2006 Hudson
2006/0252435 A1 11/2006 Henderson et al.
2006/0253456 A1 11/2006 Pacholec et al.
2006/0253605 A1 11/2006 Sundarrajan et al.
2006/0259923 A1 11/2006 Chiu
2006/0265595 A1 11/2006 Scottodiluzio
2006/0271884 A1 11/2006 Hurst
2006/0277265 A1 12/2006 Backholm et al.
2006/0277271 A1 12/2006 Morse et al.
2006/0294071 A1 12/2006 Weare et al.
2006/0294223 A1 12/2006 Glasgow et al.
2007/0005738 A1 1/2007 Alexion-Tiernan et al.
2007/0006317 A1 1/2007 Asami et al.
2007/0011367 A1 1/2007 Scott et al.

(56) References Cited

U.S. PATENT DOCUMENTS

2007/0019610 A1 1/2007 Backholm et al.
2007/0022118 A1 1/2007 Layne
2007/0027775 A1 2/2007 Hwang
2007/0027832 A1 2/2007 Fiatal et al.
2007/0027886 A1 2/2007 Gent et al.
2007/0027917 A1 2/2007 Ariel et al.
2007/0027920 A1 2/2007 Alvarado et al.
2007/0027921 A1 2/2007 Alvarado et al.
2007/0027930 A1 2/2007 Alvarado et al.
2007/0033531 A1 2/2007 Marsh
2007/0038567 A1 2/2007 Allaire et al.
2007/0038931 A1 2/2007 Allaire et al.
2007/0044041 A1 2/2007 Beynon et al.
2007/0049258 A1 3/2007 Thibeault
2007/0060196 A1 3/2007 Sharma
2007/0061393 A1 3/2007 Moore
2007/0067147 A1 3/2007 Huang
2007/0067381 A1 3/2007 Grant et al.
2007/0067424 A1 3/2007 Raciborski et al.
2007/0070931 A1 3/2007 Lewis et al.
2007/0072617 A1 3/2007 Lewis et al.
2007/0078857 A1 4/2007 Punaganti et al.
2007/0078964 A1 4/2007 East et al.
2007/0088852 A1 4/2007 Levkovitz
2007/0105627 A1 5/2007 Campbell
2007/0111764 A1 5/2007 Park et al.
2007/0116223 A1 5/2007 Burke et al.
2007/0118620 A1 5/2007 Cartmell et al.
2007/0130108 A1 6/2007 Simpson et al.
2007/0130217 A1 6/2007 Linyard et al.
2007/0140193 A1 6/2007 Dosa et al.
2007/0147317 A1 6/2007 Smith et al.
2007/0147411 A1 6/2007 Bijwaard et al.
2007/0150881 A1 6/2007 Khawand et al.
2007/0156824 A1 7/2007 Thompson
2007/0156842 A1 7/2007 Vermeulen et al.
2007/0162514 A1 7/2007 Civetta et al.
2007/0167178 A1 7/2007 Al-Harbi
2007/0174433 A1 7/2007 Mendez et al.
2007/0175998 A1 8/2007 Lev
2007/0198698 A1 8/2007 Boyd et al.
2007/0220080 A1 9/2007 Humphrey
2007/0220099 A1 9/2007 Di Giorgio et al.
2007/0233855 A1 10/2007 Brown et al.
2007/0237318 A1 10/2007 McGary
2007/0245010 A1 10/2007 Arn et al.
2007/0249365 A1 10/2007 Jendbro
2007/0250591 A1 10/2007 Milic-Frayling et al.
2007/0254631 A1 11/2007 Spooner
2007/0255848 A1 11/2007 Sewall et al.
2007/0264993 A1 11/2007 Hughes
2007/0267492 A1 11/2007 Maclaine Pont
2007/0276925 A1 11/2007 LaJoie et al.
2007/0276926 A1 11/2007 LaJoie et al.
2007/0288469 A1 12/2007 Shenfield
2007/0290787 A1 12/2007 Fiatal et al.
2007/0293207 A1 12/2007 Guedalia et al.
2007/0293238 A1 12/2007 Fiatal et al.
2007/0293958 A1 12/2007 Stehle et al.
2007/0294295 A1 12/2007 Finkelstein et al.
2007/0294763 A1 12/2007 Udezue et al.
2007/0296701 A1 12/2007 Pope et al.
2007/0299918 A1 12/2007 Roberts
2008/0001717 A1 1/2008 Fiatal
2008/0008095 A1 1/2008 Gilfix
2008/0009344 A1 1/2008 Graham et al.
2008/0016236 A1 1/2008 Beverly et al.
2008/0032718 A1 2/2008 Suresh
2008/0034031 A1 2/2008 Weisbrot et al.
2008/0037787 A1 2/2008 Boynton et al.
2008/0059308 A1 3/2008 Gerken
2008/0059398 A1 3/2008 Tsutsui
2008/0061142 A1 3/2008 Howcroft et al.
2008/0068519 A1 3/2008 Adler et al.
2008/0077506 A1 3/2008 Rampell et al.
2008/0077571 A1 3/2008 Harris et al.
2008/0085719 A1 4/2008 Kuchibhotla et al.
2008/0085724 A1 4/2008 Cormier et al.
2008/0086379 A1 4/2008 Dion et al.
2008/0091773 A1 4/2008 Hameen-Anttila
2008/0103877 A1 5/2008 Gerken
2008/0104666 A1 5/2008 Dillaway
2008/0108298 A1 5/2008 Selen et al.
2008/0114881 A1 5/2008 Lee et al.
2008/0125225 A1 5/2008 Lazaridis et al.
2008/0130663 A1 6/2008 Fridman et al.
2008/0133326 A1 6/2008 Goncalves et al.
2008/0133641 A1 6/2008 Gent et al.
2008/0133708 A1 6/2008 Alvarado et al.
2008/0134292 A1 6/2008 Ariel et al.
2008/0140665 A1 6/2008 Ariel et al.
2008/0151817 A1 6/2008 Fitchett et al.
2008/0154870 A1 6/2008 Evermann et al.
2008/0155613 A1 6/2008 Benya et al.
2008/0166999 A1 7/2008 Guedalia et al.
2008/0167019 A1 7/2008 Guedalia et al.
2008/0168145 A1 7/2008 Wilson
2008/0183800 A1 7/2008 Herzog et al.
2008/0192820 A1 8/2008 Brooks et al.
2008/0198995 A1 8/2008 McGary et al.
2008/0201362 A1 8/2008 Multer et al.
2008/0201751 A1 8/2008 Ahmed et al.
2008/0207182 A1 8/2008 Maharajh et al.
2008/0209491 A1 8/2008 Hasek
2008/0214148 A1 9/2008 Ramer et al.
2008/0216094 A1 9/2008 Anderson et al.
2008/0220797 A1 9/2008 Meiby et al.
2008/0232290 A1 9/2008 Elzur et al.
2008/0233983 A1 9/2008 Park et al.
2008/0242370 A1 10/2008 Lando et al.
2008/0263170 A1 10/2008 Caron et al.
2008/0270379 A1 10/2008 Ramakrishna
2008/0273498 A1 11/2008 Jalil et al.
2008/0281798 A1 11/2008 Chatterjee et al.
2008/0288659 A1 11/2008 Hasha et al.
2008/0298386 A1 12/2008 Fiatal
2008/0299956 A1 12/2008 Bailey et al.
2008/0301231 A1 12/2008 Mehta et al.
2008/0301300 A1 12/2008 Toub
2008/0313282 A1 12/2008 Warila et al.
2009/0010204 A1 1/2009 Pratt, Jr. et al.
2009/0010259 A1 1/2009 Sirotkin
2009/0012841 A1 1/2009 Saft et al.
2009/0016526 A1 1/2009 Fiatal et al.
2009/0019485 A1 1/2009 Ellis et al.
2009/0019532 A1 1/2009 Jacobsen et al.
2009/0024794 A1 1/2009 Iyer et al.
2009/0031006 A1 1/2009 Johnson
2009/0052372 A1 2/2009 Durazzo et al.
2009/0054034 A1 2/2009 Backholm et al.
2009/0055353 A1 2/2009 Meema
2009/0059950 A1 3/2009 Gao et al.
2009/0063647 A1 3/2009 Backholm et al.
2009/0075683 A1 3/2009 Backholm et al.
2009/0077263 A1 3/2009 Koganti et al.
2009/0077326 A1 3/2009 Motohashi
2009/0094317 A1 4/2009 Venkitaraman
2009/0100416 A1 4/2009 Brown et al.
2009/0110179 A1 4/2009 Elsey et al.
2009/0119266 A1 5/2009 Fitzpatrick et al.
2009/0125523 A1 5/2009 Fitzpatrick et al.
2009/0144632 A1 6/2009 Mendez
2009/0147008 A1 6/2009 Do et al.
2009/0149203 A1 6/2009 Backholm et al.
2009/0156178 A1 6/2009 Elsey et al.
2009/0157792 A1 6/2009 Fiatal
2009/0164433 A1 6/2009 R et al.
2009/0164560 A1 6/2009 Fiatal
2009/0172565 A1 7/2009 Jackson et al.
2009/0181641 A1 7/2009 Fiatal
2009/0182500 A1 7/2009 Dicke
2009/0187939 A1 7/2009 Lajoie
2009/0191903 A1 7/2009 Fiatal
2009/0193130 A1 7/2009 Fiatal

(56) References Cited

U.S. PATENT DOCUMENTS

2009/0193338 A1 7/2009 Fiatal
2009/0215504 A1 8/2009 Lando
2009/0221326 A1 9/2009 Roussel et al.
2009/0228545 A1 9/2009 Mendez et al.
2009/0241180 A1 9/2009 Fiatal
2009/0248670 A1 10/2009 Fiatal
2009/0248696 A1 10/2009 Rowles et al.
2009/0248794 A1 10/2009 Helms et al.
2009/0248878 A1 10/2009 Tran et al.
2009/0252136 A1 10/2009 Mahany et al.
2009/0254589 A1 10/2009 Nair et al.
2009/0254971 A1 10/2009 Herz et al.
2009/0264138 A1 10/2009 Kang et al.
2009/0282125 A1 11/2009 Jeide et al.
2009/0286531 A1 11/2009 Bhatt et al.
2009/0287750 A1 11/2009 Banavar et al.
2009/0299817 A1 12/2009 Fok et al.
2009/0307133 A1 12/2009 Holloway et al.
2009/0318171 A1 12/2009 Backholm et al.
2009/0323678 A1 12/2009 Wang
2009/0325565 A1 12/2009 Backholm
2009/0327390 A1 12/2009 Tran et al.
2010/0042691 A1 2/2010 Maguire
2010/0049872 A1 2/2010 Roskind
2010/0057924 A1 3/2010 Rauber et al.
2010/0069127 A1 3/2010 Fiennes
2010/0077035 A1 3/2010 Li et al.
2010/0077083 A1 3/2010 Tran et al.
2010/0083255 A1 4/2010 Bane et al.
2010/0087167 A1 4/2010 Tsurutome et al.
2010/0088722 A1 4/2010 Jiang
2010/0093273 A1 4/2010 Hohl
2010/0115050 A1 5/2010 Sultenfuss et al.
2010/0118190 A1 5/2010 Salfati et al.
2010/0131593 A1 5/2010 Kihara et al.
2010/0131617 A1 5/2010 Osborne et al.
2010/0146107 A1 6/2010 Fiatal
2010/0149975 A1 6/2010 Tripathi et al.
2010/0174735 A1 7/2010 Fiatal
2010/0174939 A1 7/2010 Vexler
2010/0186011 A1 7/2010 Magenheimer
2010/0207870 A1 8/2010 Cho
2010/0211651 A1 8/2010 Guedalia et al.
2010/0214984 A1 8/2010 Cho et al.
2010/0227594 A1 9/2010 DeVries
2010/0228863 A1 9/2010 Kawauchi
2010/0229096 A1 9/2010 Maiocco et al.
2010/0238915 A1 9/2010 Cayla et al.
2010/0250706 A1 9/2010 Burckart et al.
2010/0250986 A1 9/2010 Black et al.
2010/0268757 A1 10/2010 Fisher
2010/0274983 A1 10/2010 Murphy et al.
2010/0279662 A1 11/2010 Kuusinen et al.
2010/0293335 A1 11/2010 Muthiah et al.
2010/0299223 A1 11/2010 Crouch
2010/0313018 A1 12/2010 Jorgensen
2010/0319054 A1 12/2010 Mehta et al.
2010/0322124 A1 12/2010 Luoma et al.
2010/0325306 A1 12/2010 Vimpari et al.
2011/0028129 A1 2/2011 Hutchison et al.
2011/0040718 A1 2/2011 Tendjoukian et al.
2011/0065424 A1 3/2011 Estevez et al.
2011/0066646 A1 3/2011 Danado et al.
2011/0099363 A1 4/2011 Boynton et al.
2011/0113109 A1 5/2011 LeVasseur et al.
2011/0119134 A1 5/2011 Zivkovic et al.
2011/0126060 A1 5/2011 Grube et al.
2011/0138102 A1 6/2011 Glikson et al.
2011/0138402 A1 6/2011 Fleming
2011/0153937 A1 6/2011 Annamalaisami et al.
2011/0158239 A1 6/2011 Mohaban
2011/0165889 A1 7/2011 Fiatal et al.
2011/0179138 A1 7/2011 Van Geest et al.
2011/0179377 A1 7/2011 Fleming
2011/0182220 A1 7/2011 Black et al.
2011/0184827 A1 7/2011 Hubert
2011/0185355 A1 7/2011 Chawla et al.
2011/0190014 A1 8/2011 Fiatal
2011/0191474 A1 8/2011 Fiatal
2011/0201304 A1 8/2011 Sutaria et al.
2011/0207436 A1 8/2011 van Gent et al.
2011/0208810 A1 8/2011 Li et al.
2011/0213800 A1 9/2011 Saros et al.
2011/0213898 A1 9/2011 Fiatal et al.
2011/0214182 A1 9/2011 Adams et al.
2011/0238772 A1 9/2011 Fiatal
2011/0246950 A1 10/2011 Luna et al.
2011/0252088 A1 10/2011 Fiatal
2011/0264622 A1 10/2011 Vargas et al.
2011/0264731 A1 10/2011 Knowles et al.
2011/0294463 A1 12/2011 Fiatal
2011/0294464 A1 12/2011 Fiatal
2011/0296050 A1 12/2011 Cherukuri
2011/0296120 A1 12/2011 Khan
2011/0296415 A1 12/2011 Khan et al.
2011/0302154 A1 12/2011 Snyder
2012/0005276 A1 1/2012 Guo et al.
2012/0008536 A1 1/2012 Tervahauta et al.
2012/0022980 A1 1/2012 Angelone
2012/0023190 A1 1/2012 Backholm et al.
2012/0023226 A1 1/2012 Petersen et al.
2012/0023236 A1 1/2012 Backholm et al.
2012/0030280 A1 2/2012 Wang et al.
2012/0054386 A1 3/2012 Hanes
2012/0072910 A1 3/2012 Martin et al.
2012/0077482 A1 3/2012 Backholm
2012/0078996 A1 3/2012 Shah
2012/0096092 A1 4/2012 Davidge et al.
2012/0108225 A1 5/2012 Luna et al.
2012/0110109 A1 5/2012 Luna et al.
2012/0110110 A1 5/2012 Luna et al.
2012/0110111 A1 5/2012 Luna et al.
2012/0110112 A1 5/2012 Luna et al.
2012/0110118 A1 5/2012 Luna et al.
2012/0110171 A1 5/2012 Luna et al.
2012/0110173 A1 5/2012 Luna et al.
2012/0110174 A1 5/2012 Wootton et al.
2012/0110275 A1 5/2012 Ganti et al.
2012/0130973 A1 5/2012 Tamm et al.
2012/0131095 A1 5/2012 Luna et al.
2012/0131184 A1 5/2012 Luna et al.
2012/0135726 A1 5/2012 Luna et al.
2012/0140750 A1 6/2012 Yan et al.
2012/0149352 A1 6/2012 Backholm et al.
2012/0151044 A1 6/2012 Luna et al.
2012/0157170 A1 6/2012 Backholm et al.
2012/0158837 A1 6/2012 Kaul
2012/0158908 A1 6/2012 Luna et al.
2012/0170496 A1 7/2012 Yang et al.
2012/0173616 A1 7/2012 Luna et al.
2012/0174220 A1 7/2012 Rodriguez
2012/0176968 A1 7/2012 Luna
2012/0178414 A1 7/2012 Fiatal
2012/0179801 A1 7/2012 Luna et al.
2012/0185597 A1 7/2012 Luna
2012/0185918 A1 7/2012 Backholm et al.
2012/0210121 A1 8/2012 Boynton et al.
2012/0226767 A1 9/2012 Luna et al.
2012/0227059 A1 9/2012 Fleming

FOREIGN PATENT DOCUMENTS

EP 1422899 A1 5/2004
EP 1462975 A1 9/2004
EP 1466261 A1 10/2004
EP 1466435 A1 10/2004
EP 1482702 A1 12/2004
EP 1815634 A1 8/2007
EP 1815652 A1 8/2007
EP 1817883 A1 8/2007
FI 117152 B 6/2006
FI 118288 B 9/2007
FI 119581 B 12/2008
JP 4-154233 5/1992

(56) References Cited

FOREIGN PATENT DOCUMENTS

| | | | |
|---|---|---|---|
| JP | 4154233 | A | 5/1992 |
| JP | 10-336372 | A | 12/1998 |
| JP | 2001-218185 | A | 8/2001 |
| JP | 2001-218185 | | 10/2001 |
| JP | 2001-350718 | A | 12/2001 |
| JP | 2001-356973 | A | 12/2001 |
| JP | 2005-515664 | T | 5/2005 |
| JP | 2009-207177 | A | 9/2009 |
| JP | 4386732 | B2 | 10/2009 |
| KR | 2001-0018568 | A | 3/2001 |
| KR | 2006-0068186 | A | 6/2006 |
| KR | 2007-0071858 | A1 | 7/2007 |
| KR | 10-0765238 | B1 | 10/2007 |
| KR | 2007-0102091 | A1 | 10/2007 |
| KR | 2007-0117874 | A | 12/2007 |
| KR | 2009-0077515 | A | 7/2009 |
| KR | 2010-0064605 | A | 6/2010 |
| WO | WO 97/41661 | | 11/1997 |
| WO | WO 97/41661 | A2 | 11/1997 |
| WO | 9824257 | | 6/1998 |
| WO | WO 98/24257 | A1 | 6/1998 |
| WO | WO 98/58322 | | 12/1998 |
| WO | WO 98/58322 | A2 | 12/1998 |
| WO | WO 01/30130 | A2 | 5/2001 |
| WO | WO 03/007570 | A1 | 1/2003 |
| WO | WO 03/058483 | A1 | 7/2003 |
| WO | WO 03/058879 | A1 | 7/2003 |
| WO | WO 03/065701 | A1 | 8/2003 |
| WO | 03098890 | | 11/2003 |
| WO | WO 03/098890 | A1 | 11/2003 |
| WO | WO 2004/017591 | A2 | 2/2004 |
| WO | 2004045171 | | 5/2004 |
| WO | WO 2004/045171 | A1 | 5/2004 |
| WO | WO 2005/015925 | A2 | 2/2005 |
| WO | WO 2005/020108 | A1 | 3/2005 |
| WO | WO 2006/045005 | A2 | 4/2006 |
| WO | WO 2006/045102 | A2 | 4/2006 |
| WO | WO 2006/053952 | A1 | 5/2006 |
| WO | WO 2006/053954 | A1 | 5/2006 |
| WO | WO 2006/058967 | A1 | 6/2006 |
| WO | WO 2007/015725 | A2 | 2/2007 |
| WO | WO 2007/015726 | A1 | 2/2007 |
| WO | WO 2007/149526 | A2 | 12/2007 |
| WO | WO 2007/149540 | A2 | 12/2007 |
| WO | WO 2008/061042 | A2 | 5/2008 |
| WO | WO 2011/126889 | A2 | 10/2011 |
| WO | WO 2012/018430 | A1 | 2/2012 |
| WO | WO 2012/018431 | A1 | 2/2012 |
| WO | WO 2012/018477 | A2 | 2/2012 |
| WO | WO 2012/018479 | A2 | 2/2012 |
| WO | WO 2012/018556 | A2 | 2/2012 |
| WO | WO 2012/024030 | A2 | 2/2012 |
| WO | WO 2012/060995 | A2 | 5/2012 |
| WO | WO 2012/060996 | A2 | 5/2012 |
| WO | WO 2012/060997 | A2 | 5/2012 |
| WO | WO 2012/061430 | A2 | 5/2012 |
| WO | WO 2012/061433 | A2 | 5/2012 |
| WO | WO 2012/061437 | A1 | 5/2012 |
| WO | WO 2012/071283 | A1 | 5/2012 |
| WO | WO 2012/071384 | A2 | 5/2012 |
| WO | WO 2012/094675 | A2 | 7/2012 |

OTHER PUBLICATIONS

Android Developers, "Date," 10 pages, Oct. 27, 2011.
Augun, Audrey, "Integrating Lotus Notes With Enterprise Data," Lotus Notes Advisory, pp. 22-25, Jul.-Aug. 1996.
Balaban, Bob, "This Is Not Your Father's Basic: LotusScript in Notes Release 4," The View, vol. 1, Issue 5, 32 pages, Nov.-Dec. 1995.
Bedell, Doug, "Meeting Your New Best Friends Six Degrees Widens Your Contacts In Exchange for Sampling Web Sites," The Dallas Morning News, 4 pages, Oct. 27, 1998.
Bergman, Lawrence D. et al., "Programming-By-Demonstration for Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Published prior to Feb. 23, 2006.
Blaney, Jeff, "You Can Take It With You—An Introduction to Mobile Computing With Notes R4," The View, vol. 2, Issue 1, 14 pages, Jan.-Feb. 1996.
Braden, R., "Requirements for Internet Hosts—Application and Support," RFC 1123, 80 pages, Oct. 1989.
Brown, Kevin et al., "Mastering Lotus Notes®," Sybex Inc., 996 pages, 1995.
"Chapter: About NotesPump," Publication Unknown, 480 pages, Published prior to Jan. 8, 2003.
"Chapter 13-1—Anatomy of a Note ID," Publication Unknown, 8 pages, Published prior to Jan. 8, 2003.
Cole, Barb et al., "Lotus Airs Notes-To-Database Integration Tool," Network World, 2 pages, Oct. 2, 1995.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Dahl, Andrew, "Lotus Notes® 4 Administrator's Survival Guide," Sams Publishing, 64 pages, 1996.
Decker, Stefan et al., "The Social Semantic Desktop," Digital Enterprise Research Institute, DERI Technical Report 2004-05-02, 7 pages, May 2004.
Elz, R. et al., "Clarifications to the DNS Specification," RFC 2181, 12 pages, Jul. 1997.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
European Patent Application No. EP 05815115.0, Supplementary European Search Report, 7 pages, Nov. 17, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.
GSM Association, "Network Efficiency Task Force Fast Dormancy Best Practices," V1.0, 21 pages, May 26, 2010.
Haas, Zygmunt J. et al., "Mobile-TCP: An Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in A Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.

(56) References Cited

OTHER PUBLICATIONS

International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/US2005/038135, International Preliminary Report on Patentability, 9 pages, Oct. 31, 2011.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
International Application No. PCT/US2011/043322, International Search Report, 9 pages, Feb. 9, 2012.
International Application No. PCT/US2011/043328, International Search Report, 12 pages, Feb. 27, 2012.
International Application No. PCT/US2011/043409, International Search Report, 11 pages, Feb. 9, 2012.
International Application No. PCT/US2011/058840, International Search Report, 10 pages, Apr. 26, 2012.
International Application No. PCT/US2011/058843, International Search Report, 11 pages, May 16, 2012.
International Application No. PCT/US2011/058848, International Search Report, 10 pages, Apr. 10, 2012.
International Application No. PCT/US2011/061512, International Search Report, 10 pages, May 10, 2012.
International Application No. PCT/US2012/022121, International Search Report, 11 pages, May 14, 2012.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99/1776, 14 pages, Oct. 1999.
Koeppel, Dan, "GUIs Just Want To Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 For Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrators Guide—Server for NetWare, OS-2, and Unix," Release 3.1, 509 pages, 1994.
Lotus Development Corporation, "Lotus Notes Administrators Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmers Guide—Part 1," Release 4, 614 pages, 1995.
Lotus Development Corporation, "Lotus Notes Programmers Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.

(56) References Cited

OTHER PUBLICATIONS

Lotus Development Corporation, "Lotus Notes Quick Reference for Windows and Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Published prior to Jan. 8, 2003.
MacGregor, Rob et al., "The Domino Defense: Security in Lotus Notes and the Internet," IBM Corporation, 183 pages, Dec. 1997.
Maltz, David A. et al., "MSOCKS: An Architecture for Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is In," TechRepublic, 4 pages, Apr. 4, 2001.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—CRYPTO '85 Proceedings, vol. 218, pp. 417-426, 1985.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Myers, Brad A. et al., "Extending The Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Published prior to Jan. 8, 2003.
Opyt, Barbara et al., "Use the Internet As Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What Is Lotus NotesPump?," Publication Unknown, 88 pages, Published prior to Jan. 8, 2003.
Perez, Sarah, "Onavo's Data-Compressing Mobile App Raises $10 Million Series B From Horizons, Motorola Ventures," 2 pages, Jan. 24, 2012.
Pyle, Hugh, "The Architecture of Lotus Notes," Lotus Notes Advisor, Premiere Issue, pp. 18-27, 1995.
Pyle, Lisa, "A Jump Start to the Top Ten R3-To-R4 Migration Considerations," The View, vol. 1, Issue 5, 22 pages, Nov.-Dec. 1995.
Qualcomm Incorporated, "Managing Background Data Traffic in Mobile Devices," 16 pages, Jan. 2012.
Qualcomm, "System Parameter Recommendations to Optimize PS Data User Experience and UE Battery Life," 80-W1112-1, Revision B, 9 pages, Mar. 2007.
Ringel, Meredith et al., "iStuff: A Scalable Architecture for Lightweight, Wireless Devices for Ubicomp User Interfaces," Proceedings of UbiComp 2002, 2 pages, 2002.
Signorini, Eugene, "Seven's Service-Based Wireless Solutions Enable Enterprises to Untether E-Mail," Wireless/Mobile Enterprise & Commerce, 16 pages, Oct. 2004.
Swedeen, Bret et al., "Under The Microscope—Domino Replication," LDD Today, 8 pages, Oct. 1, 1998.
Tamura, Randall A., "Lotus® Notes™ 4 Unleashed," Sams Publishing, 928 pages, 1996.
U.S. Appl. No. 60/663,463, File History, 113 pages, Mar. 18, 2005.
Vivacqua, Adriana et al., "Profiling and Matchmaking Strategies In Support Of Opportunistic Collaboration," CoopIS/DOA/ODBASE 2003, LNCS 2888, pp. 162-177, 2003.
Wainwright, Andrew, "Secrets to Running Lotus Notes: The Decisions No One Tells You How to Make," IBM Corporation, 193 pages, Oct. 1996.
Wilcox, Adam A., "PC Learning Labs Teaches Lotus Notes 3.0," Ziff-Davis Press, 381 pages, 1993.
Wong, Harry, "Casahl's Replic-Action: Delivering True Notes-DBMS Integration," The View, vol. 2, Issue 1, pp. 33-50, Jan.-Feb. 1996.
Eronen, "TCP Wake-Up: Reducing Keep-Alive Traffic in Mobile IPv4 and Ipsec NAT Traversal," NRC-TR-2008-002, Nokia, 10 pages, Jan. 31, 2008.

(56) References Cited

OTHER PUBLICATIONS

European Patent Application No. EP 03707338.4, Examination Report, 4 pages, Sep. 9, 2011.
European Patent Application No. EP 05813041.0, Supplementary European Search Report & Examination Report, 10 pages, Apr. 25, 2013.
European Patent Application No. EP 05813045.1, Supplementary European Search Report & Examination Report, 6 pages, Apr. 9, 2013.
International Application No. PCT/US2011/044974, International Search Report & Written Opinion, 15 pages, Jun. 1, 2012.
International Application No. PCT/US2011/056474, International Search Report & Written Opinion, 9 pages, May 4, 2012.
International Application No. PCT/US2011/056476, International Search Report & Written Opinion, 12 pages, May 24, 2012.
International Application No. PCT/US2011/056478, International Search Report & Written Opinion, 11 pages, May 31, 2012.
International Application No. PCT/US2011/061795, International Search Report & Written Opinion, 10 pages, Jul. 31, 2012.
International Application No. PCT/US2012/020669, International Search Report & Written Opinion, 10 pages, Sep. 12, 2012.
International Application No. PCT/US2012/021459, International Search Report & Written Opinion, 10 pages, Jun. 1, 2012.
Newton, Harry, "Newton's Telecom Dictionary," 20th Edition, pp. 67, 127, 542, Mar. 2004.
Phillips, Joshua et al., "Modeling the Intelligence Analysis Process for Intelligent User Agent Development," Research and Practice in Human Resource Management, vol. 9, No. 1, pp. 59-73, 2001.
Seven Networks, Inc., "Seven Optimizing the Mobile Ecosystem," www.seven.com/products.traffic_optimization.php, 1 page, May 29, 2012.
Wikipedia, Definition for "General Packet Radio Service," 7 pages, downloaded on May 31, 2012.
Lotus Development Coporation, Lotus Notes Release 3.1: The Groupware Standard, Site and Systems Planning Guide 1991.
Lotus Development Corporation, Lotus Notes: The Groupware Standard—Windows, 1994.
International Search Report for PCT/US03/00618, Date of completion Mar. 19, 2003; Date of Mailing Apr. 4, 2003; ISA/US.
International Search Report for PCT/US03/00624, Date of completion Apr. 8, 2003; Date of Mailing May 13, 2003; ISA/US.
International Search Report for PCT/US05/038135, Date of completion Jan. 30, 2007; Mailing Date Aug. 8, 2008; ISA/US.
International Search Report for PCT/US05/37702, Date of completion Oct. 24, 2007; Date of Mailing Nov. 5, 2007; ISA/US.
International Preliminary Examination Report for PCT/US05/37702, Date of completion Nov. 20, 2007; ISA/US.
Written Opinion of the International Searching Authority for PCT/US05/37702; Date of completion Oct. 24, 2007; Date of mailing Nov. 5, 2007; ISA/US.
Written Opinion of the International Searching Authority for PCT/US05/38135; Date of completion Jul. 14, 2008; Date of mailing Aug. 8, 2008; ISA/US.
Stolowitz Ford Cowger, LLP, Listing of Related Cases, Jul. 13, 2009.
Victor S. Miller, "Use of Elliptic Curves in Cryptography", Lecture Notes in Computer Science, May 21, 1986, vol. 218, p. 417-426, Advances in Cryptology-Crypto' 85.
Netscape Communications Corporation, Administrator's Guide, Netscape Mail Server, Version 2.0, 1995.
IBM, "The Architecture of Lotus Notes," White Paper No. 114654, modified date: May 31, 1995.
Lotus Development Corporation, Lotus Notes Knowledge Base, "What is the Notes Replicator", Jul. 5, 1995.
Grous, Paul J., "Creating and Managing a Web Site with Lotus' InterNotes Web Publisher", The View Technical Journal for Lotus Notes® Software, vol. 1 Issue 4, Sep./Oct. 1995, pp. 3-18.
Cole, Barb et al., "Lotus airs Notes-to-database integration tool," www.looksmart.com, Oct. 2, 1995.
Lotus Development Corporation, Lotus Notes Knowledge Base, "Lotus Announces Lotus NotesPump 1.0", Oct. 31, 1995.
Lotus Development Corporation, Lotus Notes Knowledge Base, "Lotus NotesPump 1.0 Q & A", Oct. 31, 1995.
Lotus Development Corporation, Lotus Notes Knowledge Base, "Lotus NotesPump: Database Integration for Lotus Notes", Oct. 31, 1995.
Lotus Development Corporation, Lotus Notes Knowledge Base, "How to Set Up "Firewall" Protection for a Notes Domain", Nov. 6, 1995.
Lotus Development Corporation, Lotus Notes Release 4 Install Guide for Workstations, First Revision, 1996.
Lotus Development Corporation, Lotus Step by Step: A Beginner's Guide to Lotus Notes, First Revision, 1996.
Freeland, Pat and Londergan, Stephen, Lotus Notes Release 4 for Dummies™, IDG Books Worldwide, 1996.
Kreisle, Bill, Teach Yourself . . . Lotus Notes 4, MIS:Press, 1996.
Marmel, Elain, Easy Lotus® Notes Release 4.0, Que Corporation, 1996.
Lotus Development Corporation, Lotus Notes Server Up and Running!, Release 4, 1996.
Falkner, Mike, "How to Plan, Develop, and Implement Lotus Notes in Your Organization", Wiley Computer Publishing, John Wiley and Sons, Inc., 1996.
Lamp, John P., et al., "Lotus Notes Network Design", McGraw-Hill, 1996.
Tamura, Randall, A., et al., Lotus Notes 4 Unleashed, Sams Publishing, 1996.
Lotus Development Corporation, Lotus Notes Internet Cookbook for Notes Release 3, Jan. 16, 1996.
Wong, Harry, "Casahl's Replic-Action: Delivering True Notes/DBMS Integration", The View Technical Journal for Lotus Notes® Software, vol. 2, Issue 1, Jan./Feb. 1996, pp. 33-50.
IBM International Technical Support Organization, Lutos Notes Release 4 In a Multiplatform Environment, Feb. 1996.
Lotus Development Corporation, Lotus Notes Internet Cookbook for Notes Release 4, Feb. 14, 1996.
Frenkel, Garry, "Pumping for Info: Notes and Database Integration", Network Computing, May 1, 1996, pp. 76-84.
Lotus Development Corporation, Lotus Notes Knowledge Base, "Firewall Security Overview and How Firewalls Relate to Lotus Notes", May 22, 1996.
IBM Corporation, Secrets to Running Lotus Notes: The Decisions No One Tells You How to Make, Oct. 1996.
Swedeen, Bret, et al., "Under the Microscope: Domino Replication", LDD Today, Oct. 1, 1998.
Lotus Development Corporation, Lotus Inside Notes: The Architecture of Notes and the Domino Server, 2000.
Lotus Software Agreement for "Notes 4.0 NA DKTP Client UPG", Part No. 38985, Date unknown.
Lotus Development Corporation, Lotus Notes Release 3.1: Administrator's Guide—Server for Windows, 1993.
Pyle, Hugh, "The Architecture of Lotus Notes", Lotus Notes Advisor, Advisor Publication, Premier Issue 1995, pp. 18-27.
Lotus Notes Advisor, Advisor Publications, Jun. 1995, entire magazine.
Lotus Notes Advisor, Advisor Publications, Aug. 1995, entire magazine.
Lotus Notes Advisor, Advisor Publications, Oct. 1995, entire magazine.
Balaban, Bob, "This Is Not Your Fathers Basic: LotusScript in Notes Release 4", Lotus Notes Advisor, Advisor Publications, vol. 1, No. 5, Nov.-Dec. 1995, pp. 31-58.
Pyle, Lisa, "A Jump Start to the Top Ten R3-to-R4 Migration Considerations", Lotus Notes Advisor, Advisor Publications, vol. 1, No. 5, Nov.-Dec., pp. 3-20.
Lotus Notes Advisor, Advisor Publications, Dec. 1995, entire magazine.
Dahl, Andrew, Lotus Notes 4 Administrator's Survical Guide, Sams Publishing, 1996.
Netscape Communications Corporation, Administrator's Guide, Netscape News Server, Version 2.0, 1996.
Lotus Notes Advisor, Advisor Publications, Jan./Feb. 1996, entire magazine.

(56) References Cited

OTHER PUBLICATIONS

Blaney, Jeff, "You Can Take it with you: An Introduction to Mobile Computing with Notes R4," The View Technical Journal for Lotus Notes® Software, vol. 2, Issue 1, Jan./Feb. 1996, pp. 22-32.
Lotus Notes Advisor, Advisor Publications, Apr. 1996, entire magazine.
Lotus Notes Advisor, Advisor Publications, Jun. 1996, entire magazine.
Augun, Audry, "Integrating Lotus Notes With Enterprise Data," Lotus Notes Advisor, Advisor Publications, Jul./Aug. 1996, pp. 22-25.
Lotus Notes Advisor, Advisor Publications, Aug. 1996, entire magazine.
Lotus Notes Advisor, Advisor Publications, Oct. 1996, entire magazine.
Opyt, Barbara et al., "Use the Internet as Your Lotus Notes WAN", Lotus Notes Advisor, Advisor Publications, Nov./Dec. 1996, pp. 17-20.
Lotus Notes Advisor, Advisor Publications, Dec. 1996. entire magazine.
"The History of Notes and Domino", Lotus Developer Domain, Lotus, Sep. 29, 2003.
Lotus NotesPump miscellaneous paper, date unkown.
NotesPump 1.0 Release Notes, date unknown.
Lotus Notes-Notes Administration Help screen shot, date unknown.
Chapter 13-1, publication unknown, "Anantomy of a Note ID", date unknown.
Chapter: About NotesPump, publication unknown, date unknown.
Lotus Development Corporation, Lotus Quick Reference for SmartIcons, Lotus Notes Release 3.1, Date unknown.
Lotus Development Corporation, Lotus Quick Reference for Windows and Presentation Manager, Lotus Notes Release 3, Date unknown.
Lotus Development Corporation, Lotus Quick Reference for Macintosh, Lotus Notes Release 3.0, Date unknown.
Lotus Development Corporation, Lotus Quick Reference for Application Developer's, Lotus Notes Release 3, Date Unknown.
Lotus Development Corporation, Lotus Customer Support Service, Lotus Notes Customer Support Guides, Date Unknown.
Lotus Development Corporation, Lotus Notes 3.3, Lotus Customer Support, North American Guide, 29 pages, Date unknown.
Lotus Development Corporation, Lotus Notes 4.0, Lotus Customer Support, North American Guide, 29 pages, Date unknown.
Lotus Development Corporation, Lotus Notes 4.1 Starter Pack; Lotus Customer Support, North American Guide, 51 pages, Date unknown.
Lotus Development Corporation, "LotusScript Clases for Notes Release 4", 6 pages, date unknown.
Allchin, James E., "An Architecture for Reliable Decentralized Systems", UMI Dissertation Services, Copyright 1983.
Lotus Development Corporation, Lotus Notes Release 3.1: The Groupware Standard, Administrator's Guide—Server for NetWare, OS/2, and UNIX, 1989.
Lotus Development Corporation, Lotus Notes 3.0: The Quick and Easy Way to Learn, Ziff-Davis Press, 1993.
Lotus Development Corporation, Lotus Notes Release 3.3: Start Here, Workstation Install for Windows, OS/2 and Macintosh, 1993.
Lotus Development Corporation, Lotus Notes Release 3.1: The Groupware Standard, Customer Services Application Guide, 1994.
Lotus Development Corporation, Lotus Notes Release 3.1: The Groupware Standard, Getting Started with Application Development, 1994.
Lotus Development Corporation, Lotus Notes Release 3.1: The Groupware Standard, Network Driver Documentation, 1994.
Kornblith, Polly R., Lotus Notes Answers: Certified Tech Support, Covers Lotus Notes Release 3, Osborne McGraw-Hill, 1994.
Freeland, Pat and Londergan, Stephen, Lotus Notes 3/3.1 for Dummies™, IDG Books Worldwide, 1994.
Gewirtz, David, Lotus Notes 3 Revealed! Your Guide to Managing Information and Improving Communication Throughhout Your Organization, Prima Publishing, 1994.
Shafran, Andrew B., Easy Lotus notes for Windows™, Que® Corporation, 1994.
Lotus Development Corporation, Lotus Notes Release 3.3: The Groupware Standard, Administration, 1994.
McMullen, Melanie, Editor, Network Remote Access and Mobile Computing, Miller Freeman Inc., 1994.
Lotus Development Corporation, Lotus Notes: The Groupware Standard—Windows, Version 3.3, 1994.
IntelliLink Corporation, IntelliLink® For Windows User's Guide, Version 3.0, 1994.
Lotus Development Corporation, Lotus Notes Release 4: InterNotes Web Navigator Administrator's Guide, 1995.
Lotus Development Corporation, Lotus InterNotes Release 4 Web Publisher: InterNotes Web Publisher Guide, 1995.
Lotus Development Corporation, Lotus Notes Release 4 Install Guide for Servers, 1995.
Lotus Development Corporation, Lotus Notes Release 4.1 Release Note, 1995.
Lotus Development Corporation, Lotus Notes Release 4 Migration Guide, 1995.
Lotus Development Corporation, Lotus Notes Release 4 Database Manager's Guide, 1995.
Lotus Development Corporation, Lotus Notes Release 4 Install Guide for Workstations, 1995.
Lotus Development Corporation, Lotus Step by Step: A Beginner's Guide to Lotus Notes, 1995.
Lotus Development Corporation, Lotus Notes Release 4 Programmer's Guide Part 1, 1995.
Lotus Development Corporation, Lotus Notes Release 4 Programmer's Guide Part 2, 1995.
Lotus Development Corporation, Lotus Notes Release 4 Administrator's guide, 1995.
Lotus Development Corporation, Lotus Notes Release 4 Deployment Guide, 1995.
Lotus Development Corporation, Lotus Notes Release 4 Application Developer's Guide, 1995.
Lotus Development Corporation, Lotus Notes Release 4 InterNotes Web Navigator User's Guide, 1995.
Lotus Development Corporation, Lotus Notes Release 4 Release Notes, 1995.
Lotus Development Corporation, Lotus Notes Release 4.5 Install Guide for Workstaion, 1995.
Lotus Development Corporation, Release Notes, Lotus Notes Release 3.30, Windows, OS/2, and Macintosh, 1995.
Brown, Kevin, et al., Mastering Lotus® Notes®, SYBEX Inc., 1995.
Lotus Development Corporation, Lotus Notes Release 4.5, Network Configuration Guide, 1995.
Netscape Communications Corporation, Installation Guide, Netscape Mail Server, Version 2.0 for Unix, 1995.
Netscape Communications Corporation, User's Guide, Netscape Mail Server, Version 2.0 for Unix, 1995.

* cited by examiner

METHOD AND APPARATUS FOR INTERCEPTING EVENTS IN A COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[The present] *This patent* application *is a reissue application for commonly assigned U.S. Pat. No. 7,680,281, issued from U.S. patent application Ser. No. 12/211,790, filed on Sep. 16, 2008, which* is a continuation of U.S. patent application Ser. No. 11/255,291, filed on Oct. 20, 2005*, now U.S. Pat. No. 7,441,271*, which claims priority to U.S. Provisional Patent Application No. 60/620,889, filed on Oct. 20, 2004, each of which are hereby incorporated by reference in their entirety.

BACKGROUND

Wireless digital communication systems wirelessly transport electronic mail (email), text messages, text files, images, Voice Over Internet Protocol (VoIP) data, and any other types of digital data and communications to wireless devices. Wireless communication system providers are facing the prospects of having to comply with a variety of legal-intercept (wiretap) requirements. Authorization for a legal intercept may include warrants for "wiretap/interception", "search and seizure", or both. For example, the requirements outlined in CALEA (US Communications Assistance for Law Enforcement Act of 1994, http://www.askcalea.net/) may have to be met by any proposed solution. In another example, the requirements outlined by the Australian Communications Authority (http://www.aca.gov.au) in the Australia Telecommunications Act of 1997 may have to be met by any proposed solution.

There are several technical challenges complying with these legal intercept requirements that may not exist in conventional telephone systems. For example, the intercepted data may be encrypted. The wireless network provider must be able to intercept the encrypted data, and any other non-encrypted information, without tipping off the intercept target that the wiretap is taking place.

The wiretap warrant may require the communication system provider to provide any intercepted information in substantially real-time or may require the communication system provider to intercept and store communications in an automated manner for later retrieval and analysis by the law enforcement agency. Evidentiary problems exist with information intercepted outside the presence and control of the enforcement agency. For example, the intercepted communications could be either intentionally or inadvertently deleted. A system malfunction could also prevent some communications from being intercepted. There is also the evidentiary issue of whether or not someone has tampered with the intercepted information. It may also be necessary to prevent technicians operating the communication system from accessing or viewing the intercepted information.

The invention addresses these and other problems with the present technology.

SUMMARY OF THE INVENTION

An intercept system provides more effective and more efficient compliance with legal intercept warrants. The intercept system can provide any combination of operations that include near-real-time intercept, capture of intercepted data in structured authenticated form, clear text intercept for communications where there is access to encryption keys, cipher text intercept for communications where there is no access to encryption keys, provision of transactional logs to the authorized agency, interception without altering the operation of the target services, and encryption of stored intercepted information.

The foregoing and other objects, features and advantages of the invention will become more readily apparent from the following detailed description of a preferred embodiment of the invention which proceeds with reference to the accompanying drawings.

DETAILED DESCRIPTION

In the description below, an intercept event refers to an event where an agency issues a warrant requesting data interception for a targeted user. A targeted user is identified by a unique label, such as a username or account number, that corresponds to a user who is under intercept. A communication event, transaction, or intercept data is any message either sent or received by the targeted user. The intercept data can include synchronization messages, email data, calendars, contacts, tasks, notes, electronic documents, files or any other type of data passing through the communication management system.

Communication Management System

Figure 1:
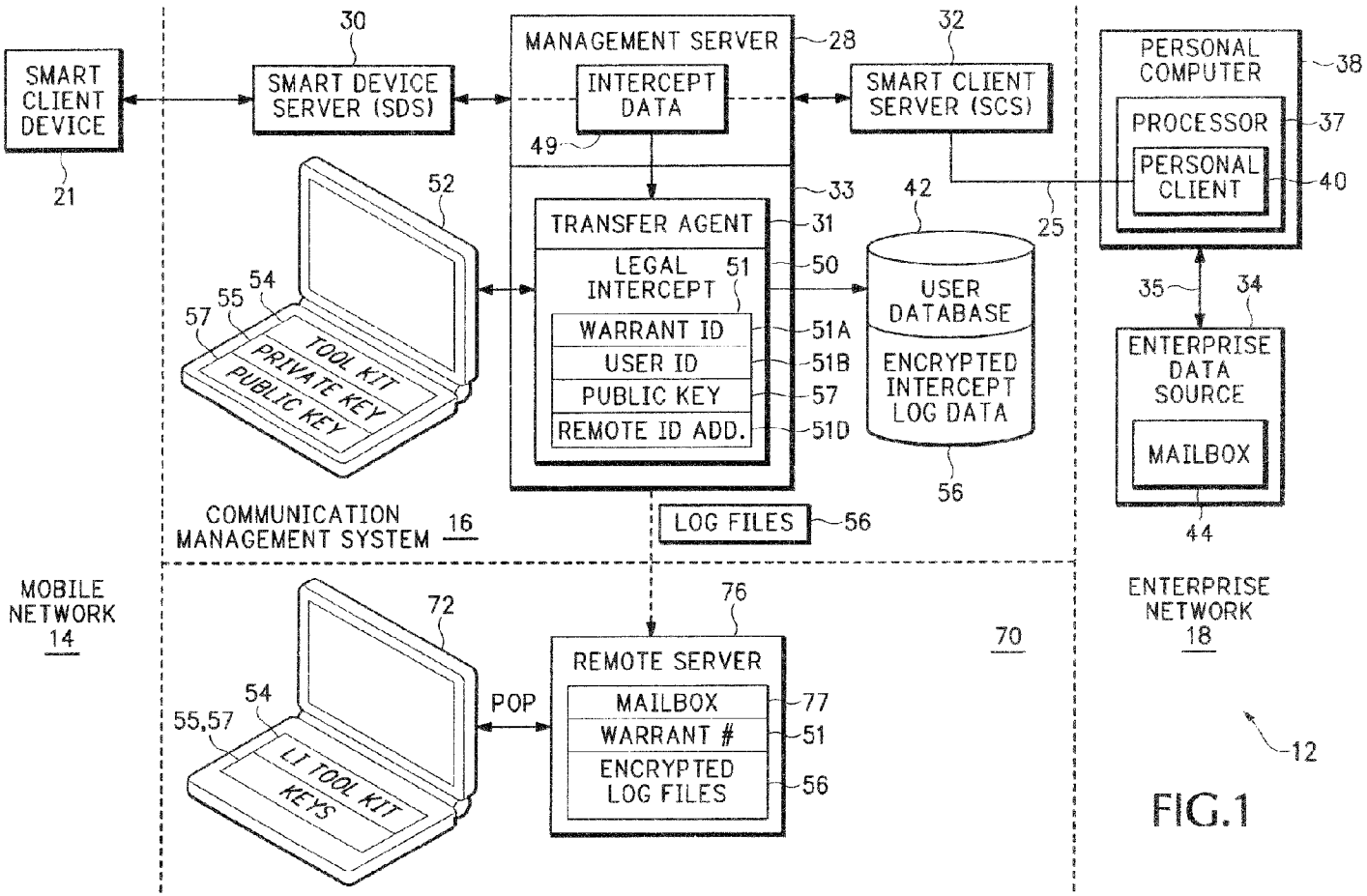
FIG. 1 is a block diagram of a communication management system that operates a legal intercept system.

FIG. 1 shows an example of a communication network 12 that may operate similarly to the networks described in U.S. patent application Ser. No. 10/339,368 entitled: CONNECTION ARCHITECTURE FOR A MOBILE NETWORK, filed Jan. 8, 2003, and U.S. patent application Ser. No. 10/339,368 entitled: SECURE, TRANSPORT FOR MOBILE COMMUNICATION NETWORK, filed Jan. 8, 2003, which are both herein incorporated by reference.

The communication system 12 in one implementation is used for intercepting data pursuant to legal search warrants. For example, a law enforcement agency may require the operator of communication system 12 to intercept all messages sent to and from a mobile device 21. It should be understood that this is just one example of a communication system 12 and that the legal intercept system described in more detail below can operate with any communication network that is required to provide legal interception.

The communication system 12 includes a mobile network 14, an enterprise network 18, and a communication management system 16 that manages communications between the mobile network 14 and the enterprise network 18. The mobile network 14 includes mobile devices 21 that communicate with an IP infrastructure through a wireless or landline service provider. Since mobile networks 14 are well known, they are not described in further detail.

The enterprise network 18 can be any business network, individual user network, or local computer system that maintains local email or other data for one or more users. In the embodiment shown in FIG. 1, the enterprise network 18 includes an enterprise data source 34 that contains a user mailbox 44 accessible using a Personal Computer (PC) 38. In one example, the enterprise data source 34 may be a Microsoft® Exchange® server and the PC 38 may access the mailbox 44 through a Microsoft® Outlook® software application. The mailbox 44 and data source 34 may contain emails, contact lists, calendars, tasks, notes, files, or any other type of data or electronic document.

The PC 38 is connected to the server 34 over a Local Area Network (LAN) 35. The PC 38 includes memory (not shown) for storing local files that may include personal email data as well as any other types of electronic documents. Personal client software 40 is executed by a processor 37 in the PC 38. The personal client 40 enables the mobile device 21 to access email, calendars, and contact information as well as local files in enterprise network 18 associated with PC 38.

The communication management system 16 includes one or more management servers 28 that each include a processor 33. The processor 33 operates a transfer agent 31 that manages the transactions between the mobile device 21 and the enterprise network 18. A user database 42 includes configuration information for different users of the mobile communication service. For example, the user database 42 may include login data for mobile device 21.

While referred to as a communication management system 16 and management server 28, this can be any intermediary system that includes one or more intermediary servers that operate between the mobile network 14 and the enterprise or private network 18. For example, a separate Smart Device Server (SDS) 30 may be used in management system 16 for handling communications with mobile devices in mobile network 14. Correspondingly, a SEVEN Connection Server (SCS) 32 may be used for handling communications with personal clients in enterprise networks 18.

Legal Interception

A Legal Intercept (LI) software module 50 is operated by the processor 33 and communicates with the transfer agent 31 in order to capture intercept data 49 associated with targeted user 51B. An operator sets up a configuration file 51 that is then used by the legal intercept module to automatically intercept communications for a particular target user and then format the intercepted communications into self authenticating log files.

An operator runs a toolkit utility 54 from a computer terminal 52 to configure the management server 28 for capturing intercept data 49. The toolkit utility 54 is used for creating and loading the configuration file 51 into memory in management server 28 and can also display detected intercept data 49. To initiate an intercept, an entry is loaded into the configuration file 51. To stop capturing intercept data 49, the system administrator deletes the entry or configuration file 51 from memory. Changes to the configuration file 51 of management server 28 may be automatically replicated to other management servers that are part of the communication management system 16. The toolkit utility 54 may have tightly controlled access that only allows operation by a user with an authorized login and password.

The toolkit 54 allows the operator to view, add, modify, and delete a warrant sequence number 51A, user identifier (ID) 51B, and encryption key 57 in the configuration file 51. The warrant identifier may be the actual sequence number for a wiretap or search warrant issued by a court of law and presented to the operator of communication management system 16 by a federal, state, or municipal government agency. The user ID 51B for example may be an identifier used by communication management system 16 to uniquely identify different mobile clients 21.

The public encryption key 57 may be the public key component of a public/private key pair, such as a Pretty Good Privacy (PGP) or GNU Privacy Guard (GPG) public key, for encrypting the intercept data 49. In one embodiment, the legal intercept module 50 may not allow the management server 28 to start an interception process until a valid public key 57 is loaded into configuration file 51. This ensures that the intercepted data 49 can be immediately encrypted while being formatted into a log file 56. If this encryption fails for any reason, the legal intercept module 50 may shut down the intercept process ensuring that no intercept data 49 is stored in the clear.

The configuration file 51 may also include one or more entries defining a transport protocol, destination, and associated configuration values for the transmission of intercepted data via a network. In one embodiment, this could include a destination email address associated with a Simple Mail Transfer Protocol (SMTP) host and port number or other Internet Protocol (IP) destination address that is used by the legal intercept module 50 to automatically transmit the intercept data 49 to mail box 77 on a remote server 76 that is accessible by the agency issuing the warrant.

After the configuration file 51 is enabled, the legal intercept module 51 starts intercepting data 49 associated with the targeted user identified by user ID 51B. As mentioned above, this can include any emails, calendar information, contacts, tasks, notes, electronic documents, files or any other type of control or content data associated with user ID 51B. The intercepted data can include any type of communications such as email sent or received, calendar items sent or received, and other data sent/received by and from the targeted smart device 21. The captured intercept data 49 may then be encrypted using the encryption key 57 contained in the configuration file 51. The encrypted copy of the captured intercept data 49 may then be formatted and written to log file 56.

Data Delivery

Figure 4:
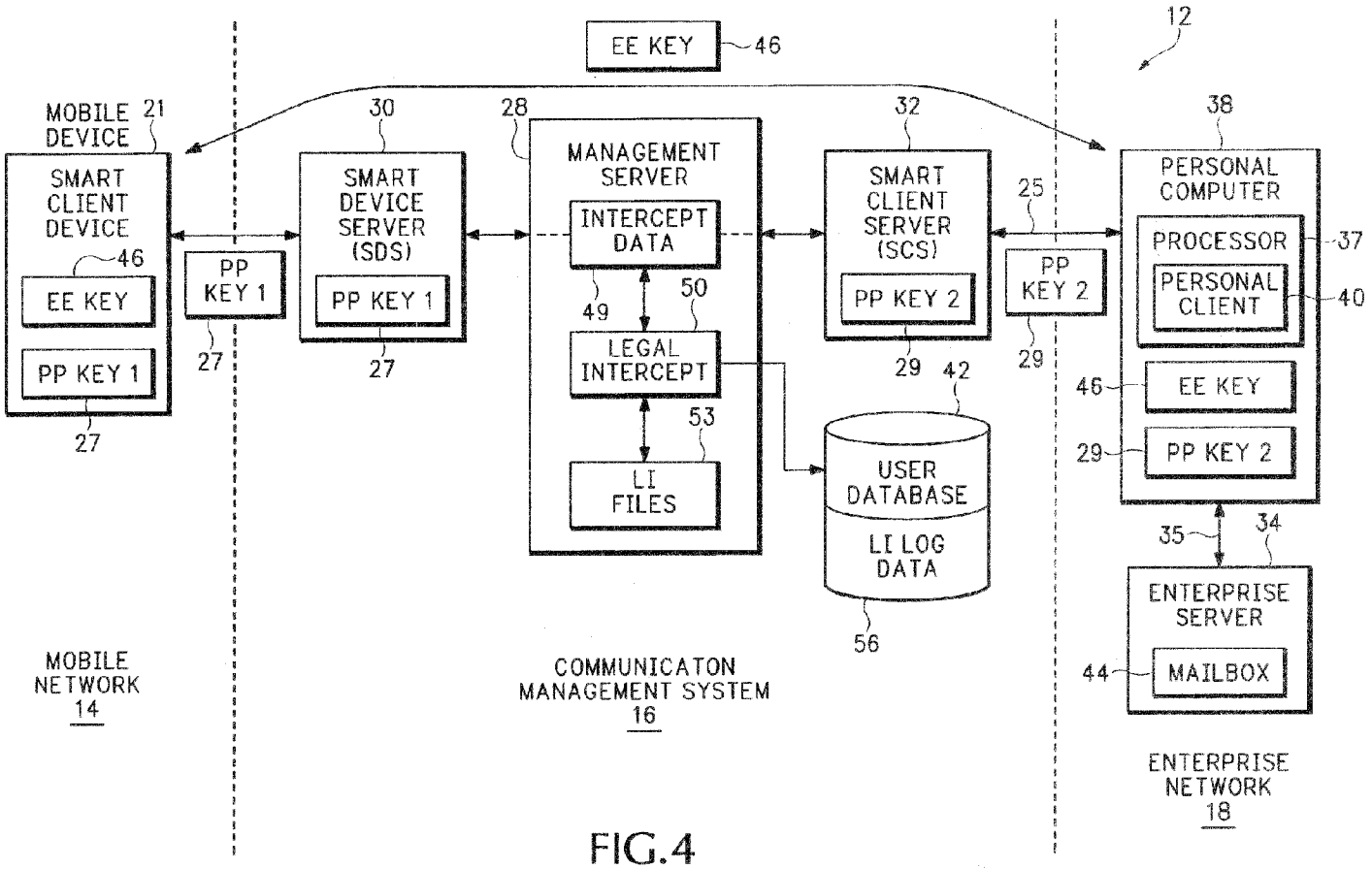
FIG. 4 is another block diagram showing how the legal intercept system operates with different types of encryption.

The legal intercept module 50 running on each management server 28 may periodically poll the directory or location containing the encrypted intercept log files 56 for each user ID under intercept for the presence of new files or data. The poll period in one example is approximately every minute. Of course this is only one example and any user configurable time period can be used. New intercept data 49 which has been stored in one or more log files 56 and identified by the legal intercept module 50 during the polling process may be automatically reprocessed and/or transmitted according to the specification in configuration file 51. As an alternative to storing encrypted intercept data 49 in log file 56 on a file system, intercept data may be stored in database 42. Also, as shown in FIG. 4, the log file 56 may be stored in an alternative file system 53 located within the management server 28. The agency issuing the warrant can then access the data contained in log files 56 or database 42 in one of many different ways.

In one implementation, an official from the agency physically sits at terminal 52 at the location of communication management system 16. The agency official then reads the log files 56 in semi-real-time as the intercept events 49 are being detected in the management server 49. The agency official then uses terminal 52 to store or copy the log files 56 onto a portable storage medium, such as a Compact Disc (CD), memory stick, etc. In this implementation, the legal intercept log files 56 may not reside in user database 42 at all, or may only reside in database 42 for some relatively brief period of time while being transferred onto the portable storage media.

A copy of the log files may be stored onto the portable storage medium while the same log files remain in the communication management system 16. The copy of the log files in the management system 16 could then be used, if necessary, for evidentiary purposes when admitting the copy under control of the agency official into evidence.

In an alternative implementation, the legal intercept module 50 may automatically send the log files 56 for the intercepted events to an email mailbox 77 operated in a remote server 76. The remote server 76 may be located in a wireless service provider network or may be located at the facilities of the enforcement agency issuing the warrant. In this implementation, a terminal 72 at the remote location 70 may include a toolkit utility 54 that has some of the same functionality as toolkit 54. The utility 54 only allows authorized users to decrypt and access the log files 56 received from communication management system 16.

For example, the toolkit utility 54 may include public and private PGP or GPG encryption keys 57 and 55, respectively, that are associated with the public encryption key 57 previously loaded into configuration file 51. Only personnel having authorized access to the toolkit 54 can decrypt and read the log files 56 previously generated and encrypted by legal intercept module 50. This provides additional privacy of the intercept data 49 from technical personnel of the communication management system 16 that may not be authorized to view the intercept data 49.

The intercept module 50 may transfer each captured log file 56 to a SMTP email server 76 via the Simple Mail Transfer Protocol (SMTP). The SMTP server 76 stores each log file 56 in an inbox of mailbox 77. The name of the mailbox 77 may be the same as the warrant sequence number @ the agency's domain name. For example, warrant123@LAPD.com. The warrant sequence number may correspond with the warrant identifier 51A in configuration file 51 and the domain name may correspond with the IP address 51D in configuration file 51. Once transmitted and accepted by the SMTP email server 76, the log file 56 may be automatically deleted from user database 42.

The agency issuing the warrant can retrieve the captured log files 56 in remote server 76 for a particular user ID under interception using for example the Post Office Protocol (POPv3). The agency is given the name of email server 76, POP and SMTP port numbers, the mailbox id (warrant sequence number 51) and a password to access the mailbox 77. The agency then retrieves log files 56 in mailbox 77 using POP. Once a file is downloaded from the mailbox 77 to an agency terminal 72, the log file 56 may be automatically deleted from the mailbox 77.

Log Files

Figure 2:
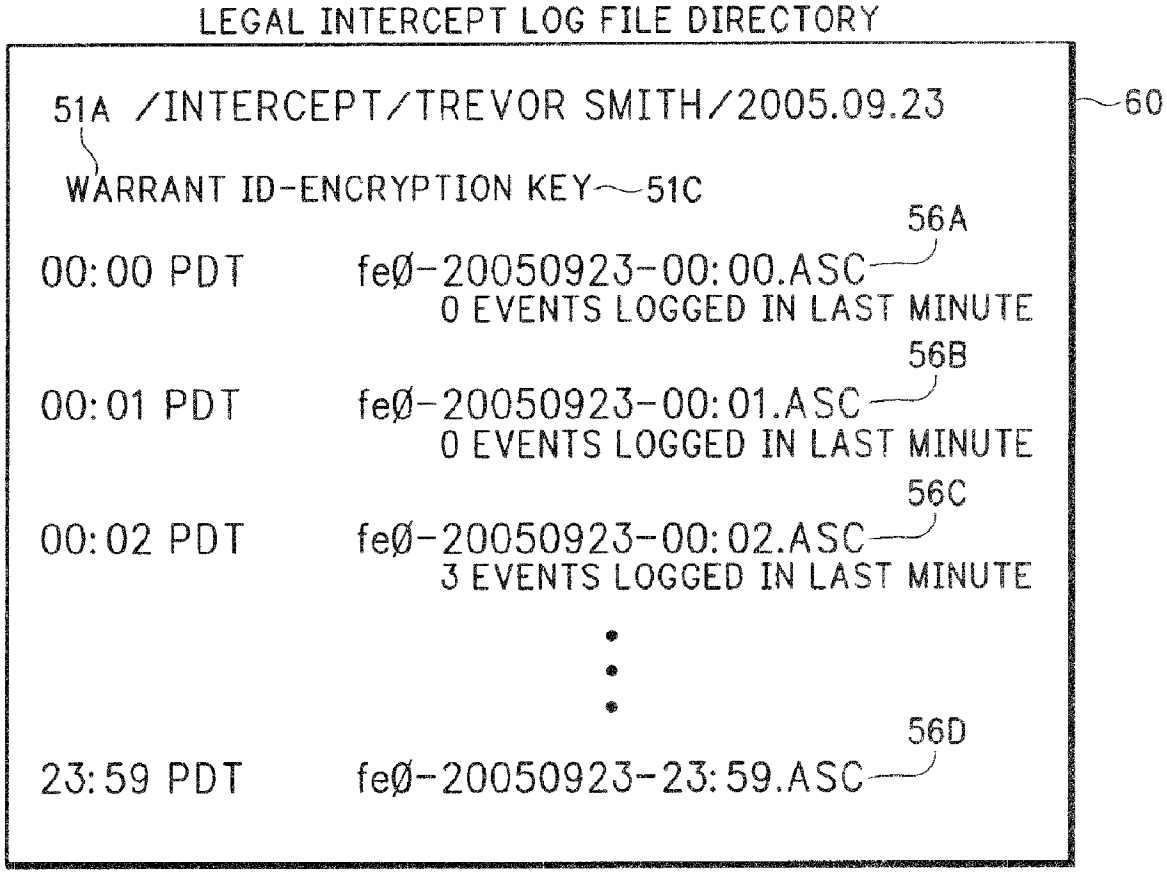
FIG. 2 is a diagram of an example log file generated for intercepted data.

Referring to FIGS. 1 and 2, the legal intercept software 50 generates log files 56 in a structured manner that provides more secure and reliable data authentication. In this example, an intercept directory 60 is loaded with log files 56 generated to account for every minute of a particular time period, such as an entire day. The legal intercept 50 may generate a name for directory 60 that identifies the contents as legal intercepts, for a particular user ID and for a particular day. Of course this is just one naming convention that can be used to more efficiently organize log files.

The log files 56 stored in directory 60 may indicate the number of events intercepted for the targeted device during each minute. For example, a first log file 56A is identified by the following log file name: fe0-2005/09/23-00:00.ASC, containing a single line that reads as follows: "0 events logged in the last minute". This indicates that a management server fe0 on Sep. 23, 2005, at 12:00 midnight logged zero intercept events for a particular user ID during the specified time period. A second log file 56B is named to identify a next minute of the intercept period and indicates that between 12:00 A.M and 12:01 A.M, on the same day, no intercept events were logged.

The first detected intercept events for this particular user ID for this particular day were detected in log file 56C identified by the log file name: fe0-2005/09/23-00:02.ASC, the first and/or last line of which reads "3 events logged in the last minute". Log file 56C indicates that 3 intercept events were detected on Sep. 23, 2005, between 12:01 A.M. and 12:02 A.M. The legal intercept 50 generates this contiguous set of log files 56 that cover each minute or other configured interval of the intercept period.

The legal intercept 50 may also load a first entry into the log file directory 60 that lists the warrant id 51A, PGP key 57, etc. The legal intercept 50 may also generate a log file 56 that indicates any management server status-change events. For example, if the management server 28 conducts a graceful shutdown, a log file 56 may be generated that indicates when the shut down occurred and possibly the cause of the shutdown.

This highly structured log file format provides the agency official a quick indicator of when intercept events are detected for a particular target user. Further, as shown above, the log files are created contiguously for predetermined time periods over a particular intercept period even when no intercept events are detected. This provides further verification that the legal intercept 50 was actually in operation and continuously monitoring for intercept events during the intercept period.

As described above, the log files 56 may be stored into a portable storage media that can be transported by an agency official. Alternatively, the log files 56 may be stored in the user database 42 in the communication management system 16 for later retrieval by the agency official via toolkit 54. In another implementation, the log files 56 may be sent to the mailbox 77 in a server 76 in a mobile operator infrastructure which is accessible by the agency official.

Figure 3:
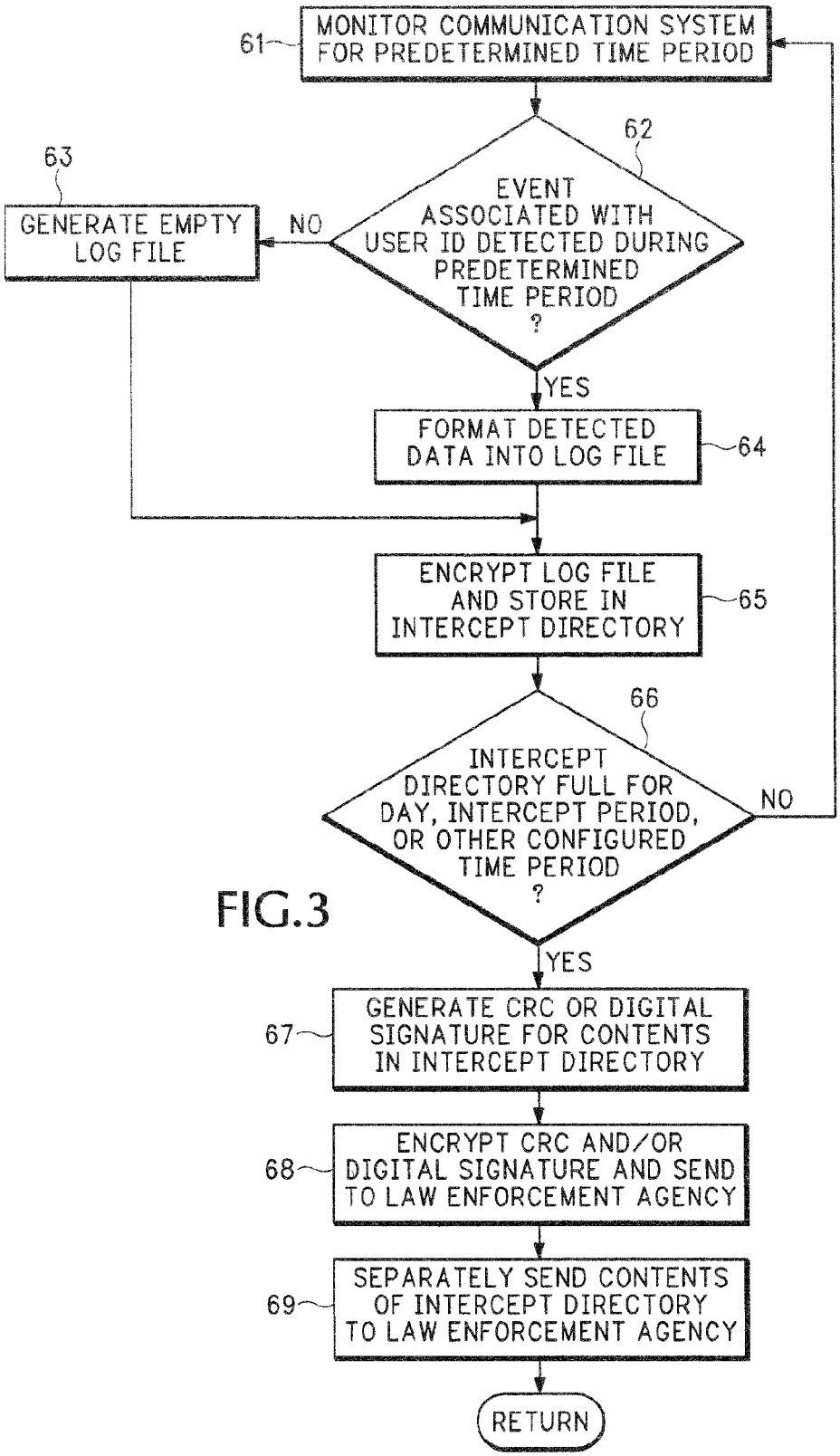
FIG. 3 is a flow diagram showing in more detail how the log files in FIG. 2 are generated.

FIG. 3 explains in further detail how the legal intercept module 50 might generate the log files. In operation 61, communications are monitored for a particular targeted user for predetermined time periods over an intercept period. In one example as described above, the predetermined time period may be one minute. Of course, time periods of less than one minute or more than one minute may also be used. The duration of these time periods may also be configurable by setting a parameter in configuration file 51. If no intercept events are detected during the predetermined time period in operation 62, an empty log file is generated for that time period in operation 63.

When intercept events are detected, all the intercepted data for that time period is formatted into a same log file 56 in operation 64. The log file is encrypted in operation 65 using the encryption key 57 (FIG. 1) loaded by the toolkit 54 into configuration file 51. All of the encrypted log files 56 associated with a particular targeted user for a particular intercept period are stored in a same intercept directory 60 (FIG. 2). For example, all log files generated for a particular user ID for a same day are stored in the same intercept directory. If the current day of legal interception is not completed in operation 66, further monitoring and interception is performed in operation 61.

When interception for a current interception period is completed, a Cyclic Redundancy Check (CRC) value, or some other type of digital certificate/signature, may be generated in operation 67. The CRC can be used to verify that the contents of intercept directory 60 have not been tampered with or deleted after their initial generation. The CRC may be encrypted in operation 68 and then separately emailed to the agency or separately stored for later validation. As discussed above, the encrypted log files may then either be emailed to a mailbox or stored locally for later retrieval by the enforcement agency.

Thus, the individual log file encryption in operation 65 ensures the authenticity of intercepted events for a particular time period and the CRC generated in operation 67 ensures that none of the individual log files have been removed or replaced.

Encrypted Intercept Data

Referring to FIG. 4, as described above, the log files 56 may be stored in database 42 or in a file system 53 within the management server 28. A single or multi-tiered encryption scheme may be used in network 12. For example, the personal client 40 may make an outbound connection 25 to the management server 28. The personal client 40 registers the presence of a particular user to the management server 28 and negotiates a security association specifying a cryptographic ciphersuite (including encryption cipher, key length, and digital signature algorithm) and a unique, secret point-to-point encryption key 29 over connection 25. In one example, the key 29 is an Advanced Encryption Standard (AES) key. Of course, encryption ciphers other than AES can also be used. The encryption key 29 enables secure communication between management server 28 and PC 38 over connection 25.

The mobile device 21 also negotiates a point-to-point security association, specifying a cryptographic ciphersuite and a unique encryption key 27, with the management server 28. In one example, the point-to-point encryption key 27 is also an AES encryption key. The negotiated security association that includes encryption key 27 enables secure point-to-point communication between the mobile device 21 and the management server 28 over connection 23. Each different mobile device 21 negotiates a different security association that includes a unique encryption key 27 with the management server 28.

The point-to-point encryption key 27 may be used for encrypting control data that needs to be transferred between the mobile device 21 and management server 28. The point-to-point encryption key 29 may be used for encrypting control data that needs to be transferred between the management server 28 and personal client 40. For example, the control data may include login information and transaction routing information.

An end-to-end security association, specifying a cryptographic ciphersuite and a unique encryption key 46, is negotiated between the mobile device 21 and the personal client 40. In one example, the end-to-end encryption key 46 is also an AES encryption key. The end-to-end encryption key 46 in one example is used for encrypting transaction payloads transferred between personal client 40 and mobile device 21. For example, the end-to-end encryption key 46 may be used for encrypting the content of emails, files, file path names, contacts, notes, calendars, electronic documents and any other type of data transferred between mobile device and the PC. The end-to-end encryption key 46 is only known by the mobile device 21 and the personal client 40. Data encrypted using the end-to-end key 46 cannot be decrypted by the management server 28.

Figure 5:
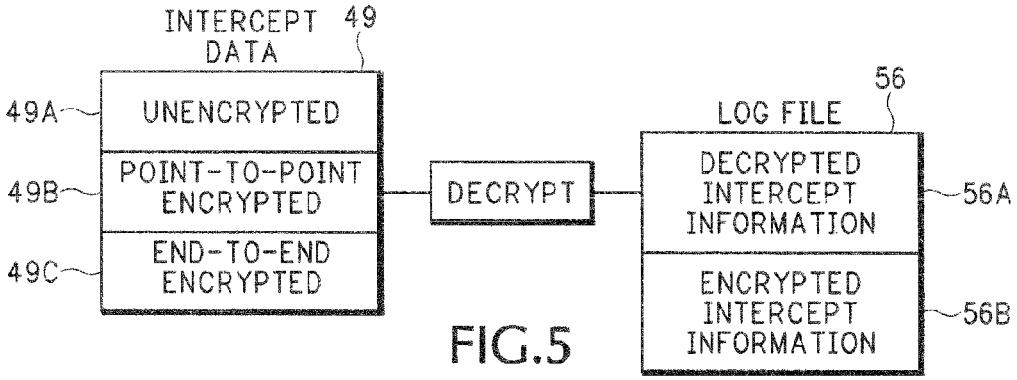
FIG. 5 is a diagram showing how intercepted data with different encryptions is converted into a log file.

Referring to FIGS. 4 and 5, the legal intercept module 50 can produce log files 56 from intercept data 49 that have any combination of unencrypted data 49A sent in the clear, point-to-point encrypted data 49B encrypted using the point-to-point encryption keys 27 or 29, and end-to-end encrypted data 49C encrypted using the end-to-end encryption key 46.

The communication management system 16 has access to the point-to-point encryption keys 27 and 29 used for encrypting the point-to-point encrypted information 49B. Therefore, the management system 16 can automatically decrypt the point-to-point encrypted information 49B before it is reformatted into log file 56.

The end-to-end encryption keys 46 are only shared between the endpoints 21 and 38 and are unknown to the communication management system 16. Therefore, the agency issuing the warrant may be required to extract the end-to-end encryption keys 46 either at the mobile device 21 or at the enterprise server 34 or personal computer 38. The end-to-end encrypted information 49C may then be decrypted at a later time separately from the point-to-point encrypted information 49B.

For example, after receiving and decrypting the log file 56, the enforcement agency may then independently conduct a seizure of the end-to-end encryption key 46 from either the enterprise network 18 or the mobile device 21. The enforcement agency could then separately decrypt information 56B in log file 56 with the seized end-to-end encryption key 46.

Figure 6:
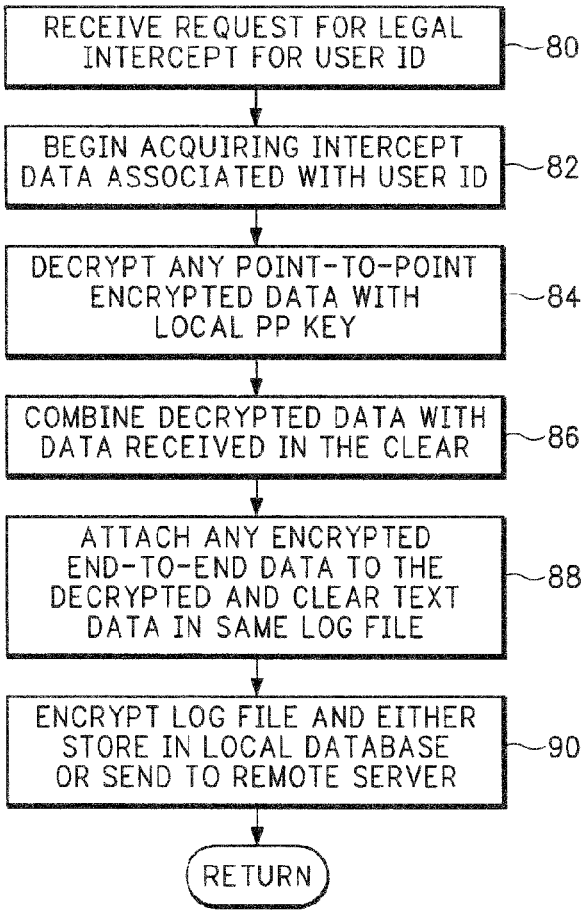
FIG. 6 is a flow diagram showing in more detail how different types of encrypted data are formatted into a log file.

FIG. 6 explains in more detail how the legal intercept module 50 handles the decryption and reformatting of intercept data into log files. In operation 80, the management server 28 is configured to conduct a legal intercept for a particular user ID as described above in FIG. 1. Accordingly, the management server 28 begins intercepting data for the identified user ID in operation 82.

In operation 84, any point-to-point encrypted portion 49B of the intercepted data 49 (FIG. 5) is decrypted. In operation 86, the decrypted point-to-point data is combined with any information 49A in the intercept data 49 received in the clear. The unencrypted data is then formatted into an unencrypted portion 56A of the log file 56 in FIG. 5. Any end-to-end encrypted data 49C is then combined in the same log file 56 as section 56B in operation 88. The log file 56 is then possibly encrypted in operation 90 and then either stored in a local database or automatically sent to a remote server.

Detecting Different Types of Intercept Data

Figure 7:
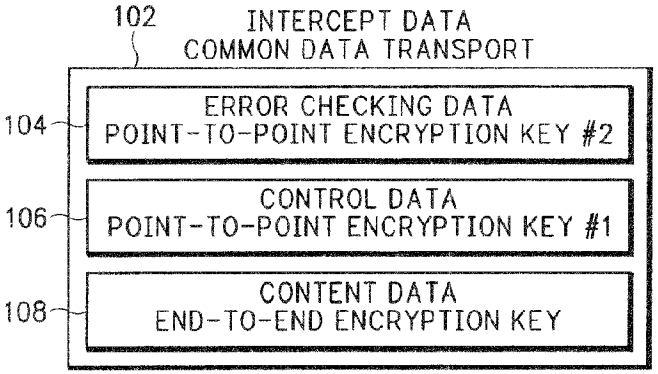
FIG. 7 is a diagram showing how a common transport is used for sending encrypted data.
Figure 8:
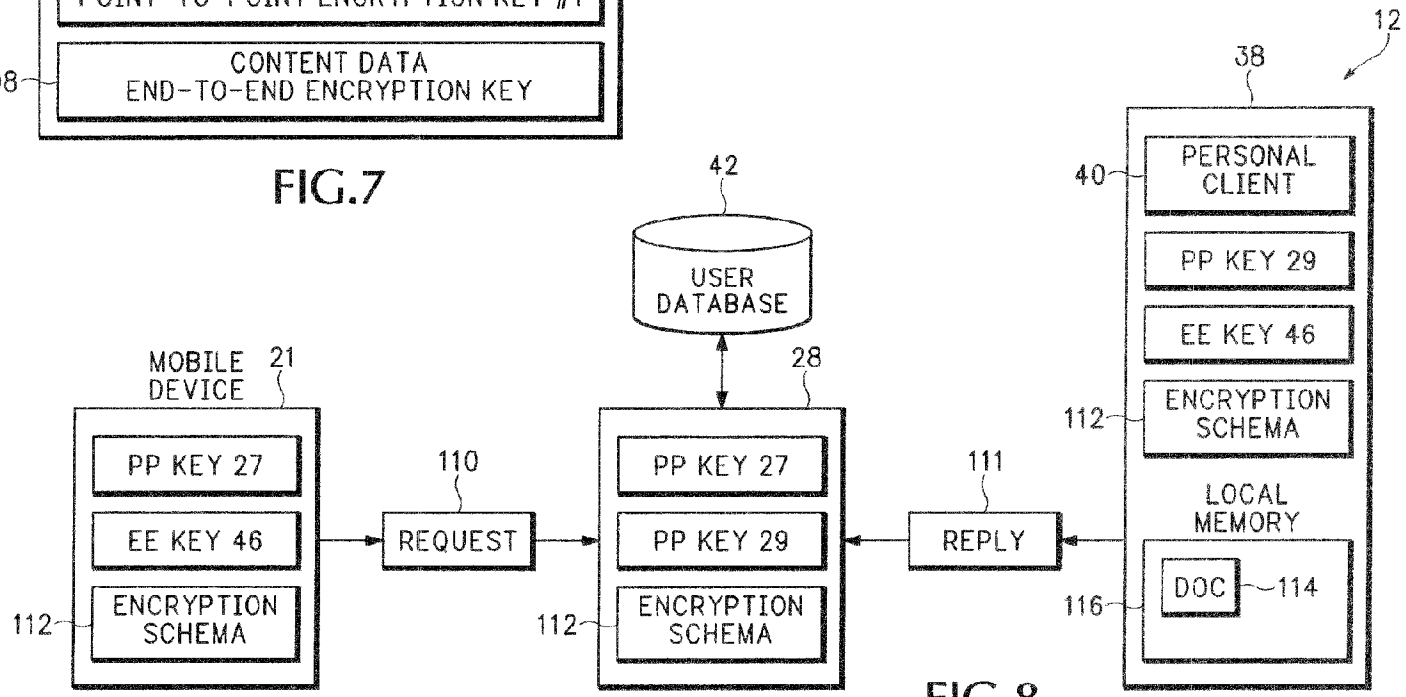
FIG. 8 is a block diagram showing how an encryption schema in the communication management system is used in cooperation with the intercept system.

FIGS. 7 and 8 explain in more detail how a particular data format used by the communication system 12 can be used to identify point-to-point and end-to-end encrypted intercept data. FIG. 7 shows how encryption can be performed differently for different types of data or for data associated with different destinations. Intercept data 102 includes content data 108 such as the contents of an email message, an electronic document, or any other type of information that should only be accessed by two endpoints. The content data 108 in this example is encrypted using an end-to-end encryption key.

A second portion 106 of intercept data 102 may include control information that only needs to be processed by one particular server. In this case, control data 106 may be encrypted using a first point-to-point encryption key. A third portion 104 of intercept data 102 may have other control information, for example, error checking data, that needs to be processed by a different server. Accordingly, the error checking data 104 is encrypted using a second point-to-point encryption key different than either of the other two encryption keys used for encrypting data 108 and 106.

FIG. 8 shows in more detail an encryption schema 112 is used by the mobile device 21, management server 28, and personal client 40 when processing transactions between a source and a target device. In the example below, the mobile device 21 is operating as a source for sending a transaction 110. The transaction 110 requests personal client 40 to send a document 114 located in a personal directory in local memory 116 of PC 38. The personal client 40 operates as a target for the transaction 110 and the management server 28 operates as the transfer agent for transferring the transaction 110 from the mobile device 21 to the personal client 40.

It should be understood that this is only an example, and the devices shown in FIG. 8 can process many different types of transactions. For example, the transaction 110 may request synchronization of emails in the PC 38 with emails in the mobile device 21. Further, any device can operate as a source or target for the transaction. For example, the personal client 40 operates as a source and the mobile device 21 operates as a target when a transaction 111 is sent as a reply to request 110.

The mobile device 21, management server 28, and the personal client 40 are all configured with an encryption schema 112 that identifies how specific items in the transaction 110 are to be encrypted. Each device is also configured with different security associations as described above in FIG. 4. For example, the mobile device 21 has both Point-to-Point (PP) key 27 and End-to-End (EE) key 46. Management server 28 has PP key 27 and PP key 29, and the PC 38 has PP key 29 and EE key 46.

The mobile device 21 forms the request transaction 110. One example of a request is as follows.

```
Request:    {auth_token = "abc",
                 device_id = "xyz",
                 method_id = "GetDocument",
                 args = {path = "/docs"}
                 }
```

Mobile device 21 attaches an auth_token to transactions sent to the management server 28. For example, the mobile device 21 may be required to authenticate to the management server 28 by transmitting a username and password prior to being permitted to submit other transactions for processing. The management server 28 issues the mobile device 21 an auth_token after successfully validating the username and password against information in the user database 42. The mobile device 21 then attaches the auth_token to subsequent transactions sent to the management server 28. The management server 28 uses the auth_token to identify and authenticate the source of each transaction and to determine where to route the transaction.

The device_id identifies the particular mobile device 21 sending the request 110. The device_id may be necessary, for example, when a user has more than one mobile device. The personal client 40 can use different device_id values to track when synchronization information was last sent to each of multiple different mobile devices. The device_id can also be used by either the management server 28 or the personal client 40 to determine how to format data sent to particular types of mobile devices 21. For example, data may need to be formatted differently for a cell phone as opposed to a personal computer. The device_id can also be used to correlate a known security association with a particular mobile device.

The method_id item in the example identifies a particular function GetDocument associated with request 110. The method_id item also requires the inclusion of related argument items that identify the parameters for the GetDocument function. For example, the argument items might include the expression path="/docs" identifying the pathname where the requested documents are located.

In order to prepare the request 110 for transmission, the mobile device 21 performs a pattern match of the request 110 using the encryption schema 112. This pattern match separates the items in request 110 into different channels. One example of the different channels is shown below. In this example, the items in each channel are associated with predefined security associations: clear, pp, and ee.

```
Channels:
          {clear = {device_id = "xyz"}
          pp = {auth_token = "abc", method_id = "GetDocument"}
          ee = {args = {path = {path = "/docs"}}}
          }
```

The channel contents are encoded (via a process commonly known as serialization) into arrays of bits or bytes referred to as data groups. These groupings of bits or bytes are referred to generally below as arrays, but can be any type of partition, group, etc.

The contents of the clear channel are encoded into an array of bits referred to as data_group__1, the contents of the pp channel are encoded into an array of bits referred to as data_group__2, and the contents of the ee channel are encoded into an array of bits referred to as data_group__3. The contents of each channel need to be encoded into bit arrays so that they can be encrypted. The contents of the channels after being encoded into bit arrays are represented as follows.

```
Encoded
Channels:    {clear = data_group_1
             pp = data_group_2
             ee = data_group_3 }
```

The bit arrays are then encrypted according to the security association parameters for each channel. According to the encryption schema 112, bits in the clear channel (data_group__1) are not encrypted. The bits in the pp channel data_group__2 are encrypted using the point-to-point security association between mobile device 21 and management server 28, using PP key 27, and are referred to after encryption as pp_data_group__2. The bits in the ee channel data_group__3 are encrypted using the end-to-end security association between mobile device 21 and personal client 40, using EE key 46, and are referred to after encryption as ee_data_group__3. The data groups are represented as follows after encryption:

| | |
|---|---|
| Encrypted Channels: | {clear = data_group_1<br>pp = pp_data_group_2<br>ee = ee_data_group_3} |

The bits making up the encrypted and unencrypted channels are then encoded into one or more packets. For clarity, the description below will refer to a single packet, however, the data from the channels may be contained in multiple packets. Some of the contents of the packet are shown below.

| Packet: | |
|---|---|
| Header | length<br>version<br>flags |
| Payload | count = 3<br>"clear"<br>data_group_1<br>pp_data_group_2<br>"ee"<br>ee_data_group_3 |

Information in the packet header may include the packet length, a version number, and other flags. The packet payload includes a count identifying 3 pairs of items. The three items include the non-encrypted contents in the clear channel, the pp encrypted contents of the pp channel, and the ee encrypted contents of the ee channel. The packet is then transported by mobile device 21 to the management server 28.

The transfer agent operating in server 28 receives the packet. The bits in the packet are separated into the different channels clear=data_group__1, pp=pp_data_group__2, and ee=ee_data_group__3.

The data in the clear channel does not need to be decrypted. The transfer agent decrypts the only bits in channels for which it has a known security association. The transfer agent, as a member of the point-to-point security association between mobile device 21 and management server 28, possesses the PP key 27 and therefore decrypts the contents of the pp channel. The transfer agent is not a member of the end-to-end security association between mobile device 21 and personal client 40, does not have the EE key 46 and therefore does not decrypt the data in the ee channel. Decryption produces the following data groups: clear data_group__1, pp=data_group__2, and ee=ee_data_group__3.

The transfer agent decodes the contents of the clear and pp channels. The contents of the encrypted ee channel are not decoded, but instead are maintained in an unmodified state for eventual transport to the personal client 40. Decoding produces the following contents.

| | |
|---|---|
| Decoded Channels: | {clear = {device_id = "xyz"}<br>pp = {auth_token = "abc", method_id = "GetDocument"}<br>ee=ee_data_group_3<br>} |

A partial request is formed by merging the items of the clear and pp channels. The partial request in this example could look similar to the following:

| | |
|---|---|
| Partial Request: | {auth_token = "abc",<br>device_id = "xyz",<br>method_id = "GetDocument",<br>args = { }<br>encrypted = {ee=ee_data_group_3}<br>} |

The transfer agent 31 in the management server 28 processes the partial request. In this example, the transfer agent may verify the request is authorized by matching the value of auth_token ("abc") with contents in the user database 42 (FIG. 8). The auth_token and the method_id ("GetDocument") indicate that the transaction 110 is a document request directed to the personal client 40.

The transfer agent may identify a user_id="joe" associated with the auth_token="abc" and generate the following new request.

| | |
|---|---|
| New Request: | {user_id = "joe",<br>device_id = "xyz",<br>method_id = "GetDocument",<br>args = { }<br>encrypted = {ee=ee_data_group_3}<br>} |

The legal intercept 50 in FIG. 1 may come into play at this point, or earlier in the encryption schema 112. For example, the legal intercept 50 checks the user_id in the request with the user id 51B in the intercept configuration file 51. In this example, if "joe" matches the user_id 51B in configuration file 51, then the contents in the request are formatted into a log file 56 as described above. As can be seen, at this point the new request has already decrypted the auth_token="abc" and method_id="GetDocument". Further, the device_id="xyz" was received in the clear. The legal intercept 50 simply has to format these different channels into a log file.

The end-to-end encrypted data in group 3 remains encrypted and therefore may not provide all of the information desired for the enforcement agency. However, the decrypted information does provide enough information to adequately indicate that the intercepted data is associated with a particular user_id. The intercepted unencrypted data may also provide further evidence that the enforcement agency can then use to obtain another warrant to seize the ee encryption key from the targeted user.

As described above in FIG. 2, the legal intercept 50 may then attach appropriate time/date stamp headers to this raw data frame to authenticate the time and date when the data was intercepted.

End-to-End Encrypted Data

As described above, the communication management system 16 may not have access to the end-to-end encryption keys 46 (FIG. 2). However, as shown in FIG. 8, the management server 28 is still capable of identifying data streams belonging to users targeted for interception, as this identifying information is required for routing the datagrams shown above. Thus, the legal intercept module 50 can still intercept data that cannot be immediately decrypted.

The intercept logs 56 can therefore contain data encrypted using encryption keys known only to the endpoints. For example, a mobile device 21 and a desktop connector running on personal computer 38 (FIG. 1). The toolkit 54 in FIG. 1 can facilitate the recovery of the end-to-end keys 46.

In order to make use of this functionality, the enforcement agency seeking the information may need to obtain both an intercept warrant, and either a search-and-seizure warrant authorizing the extraction of the configuration data from the smart device client in the mobile device 21 or a search-and-seizure warrant authorizing the extraction of the end-to-end encryption key from the desktop connector in the PC 38 (FIG. 1).

After the authorized agency has executed the necessary warrants, the toolkit 54 is used by the agency to facilitate the recovery of the end-to-end key 46. The toolkit utility 54 then uses the end-to-end key 46 to decrypt the end-to-end encrypted information in the log files 56.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method for intercepting data, comprising:

receiving, at a management server, a connection from a remote client, the connection being initiated by the remote client and established outbound from the remote client;

negotiating a point-to-point encryption scheme with a remote mobile device, the point-to-point encryption scheme negotiated between the management server and the remote mobile device;

receiving, at the management server, a value identifying an intercept target for a legal intercept and an indication that interception is authorized by a warrant, the intercept target corresponding to the remote mobile device;

automatically intercepting, at the management server, data received and/or sent by the intercept target identified by the value, wherein data is intercepted without altering operation of email application services that operate on the remote mobile device;

inspecting packets having the intercepted data to distinguish end-to-end encrypted information from other information that is encrypted according to the point-to-point encryption scheme negotiated with the remote mobile device;

preserving encryption that is included on the end-to-end encrypted information when received while removing encryption that is included on at least a portion of the other information, said other information decrypted using a key obtained during the point-to-point encryption scheme negotiation; and transferring both the decrypted other information and the end-to-end information from the management server to a remote device.

2. The method of claim 1, wherein the packets are intercepted during a requested time period, and the method further comprises:

formatting the data that is intercepted during the requested time period and associated with the target user into one or more first log files, each of the first log files corresponding to a different time segment occurring during the requested time period and indicating one or more intercept events for its corresponding time segment; and formatting one or more second different log files associated with the requested time period, the second log files indicating inactivity and corresponding to different remaining time segments that occur during the requested time period and that are unrepresented by the first log files that indicate the intercept events such that the first and second log files record monitoring for the entire requested time period independently of whether the data is intercepted intermittently during the requested time period.

3. The method of claim 2, wherein the data is intercepted according to an intercept configuration file that includes at least a unique intercept identifier and a user ID identifying the target user.

4. The method of claim 2, wherein the log files record an unbroken sequence of continuous monitoring over the requested time period independently of whether the data is intercepted intermittently.

5. The method of claim 2, further comprising transferring the log files to the remote device.

6. The method of claim 2, further comprising formatting the log files with different time values usable for verifying that communications from the remote mobile device were continuously monitored during the requested time period regardless of whether the data was intercepted intermittently.

7. The method according to claim 1, wherein the encryption that is included on the end-to-end encrypted information uses a security association that is kept secret from the management server such that the end-to-end encrypted information is kept private with respect to employees associated with the management server.

8. The method of claim 1, further comprising determining whether to encrypt at least one of the end-to-end information and the decrypted information prior to said transferring.

9. The method according to claim 1, further comprising:

combining, at the management server, the end-to-end encrypted information of the intercepted data with the decrypted other information of the intercepted data in a same log file.

10. The method according to claim 1, further comprising:

storing, at the management server, the intercepted data in a structure format that identifies when the data was intercepted and at the same time provides authentication that the stored intercepted data has not been altered or deleted.

11. The method according to claim 10, further comprising monitoring communications between the remote client and the remote mobile device for multiple contiguous time periods.

12. The method according to claim 11, further comprising:

generating, using the management server, log files over an intercept period that encompasses the multiple contiguous time periods;

storing the log files in a same intercept directory;

inserting a warrant identifier received together with the value into the intercept directory; and generating a name for the intercept directory that identifies the intercept target and the intercept period over which the log files were generated.

13. The method according to claim 12, further comprising:

encrypting the log files in the intercept directory with an encryption scheme known by an agency issuing the warrant, said encryption performed using the management server that intercepted the data; and sending the encrypted intercept directory to an electronic mailbox accessible by the agency.

14. The method according to claim 13, further comprising:

generating a Cyclic Redundancy Check (CRC) or other digital signature value for all of the log files in the intercept directory;

encrypting the resulting generated value; and providing the encrypted generated value to the enforcement agency, said encrypted generated value sent in a different communication than the encrypted intercept directory, said encrypted generated value verifying that the log files have not been altered.

15. The method according to claim 1, further comprising: reading an intercept configuration file that contains a warrant identifier, the value identifying the user, an enforcement agency known encryption key and an electronic mailbox address;

upon reading the intercept configuration file automatically intercepting data received and/or sent by the remote mobile device;

formatting any intercepted data into log files that identify when the data was intercepted; and encrypting the log files using the encryption key.

16. The method according to claim 1, wherein the end-to-end encrypted information is associated with content and is protected with an end-to-end encryption scheme that is kept secret from any midpoints located on a call path between transmitting and receiving endpoints, and the other information is associated with transaction routing information and is protected with the negotiated point-to-point encryption scheme.

17. A communication management system, comprising:

a management server configured to receive a connection initiated by a remote client and established outbound from the remote client;

the management server configured to negotiate a point-to-point encryption scheme with a remote mobile device, the point-to-point encryption scheme negotiated between the management server and the remote mobile device;

the management server configured to receive a value identifying an intercept target for a legal intercept and an indication that interception is authorized by a warrant, the intercept target corresponding to the remote mobile device;

the management server configured to automatically intercept data received and/or sent by the intercept target identified by the value, wherein the data is intercepted without altering operation of email application services that operate on the remote mobile device;

the management server configured to inspect packets having the intercepted data to distinguish end-to-end encrypted information from other information that is encrypted according to the point-to-point encryption scheme negotiated with the remote mobile device;

the management server configured to preserve encryption that is included on the end-to-end encrypted information when received while removing encryption that is included on at least a portion of the other information, said other information decrypted using a key obtained during the point-to-point encryption scheme negotiation; and the management server configured to transfer both the decrypted other information and the end-to-end information from the management server to a remote device.

18. The communication management system of claim 17, further comprising:

the management server configured to automatically format the intercepted data into log files;

the management server configured to generate multiple log files that identify any intercepted data for associated contiguous predetermined time periods extending over a continuous intercept period; and the management server configured to generate the log files for back-to-back time periods, the management server further configured to generate each log file by selecting between inserting the intercepted data and an inactivity indication therein such that each of the log files contains at least one selected from the group comprising the intercepted data for the associated time period and an indication that no data was intercepted during the associated time period.

19. The communication management system of claim 18, further comprising:

the management server is configured to select a same duration for the time periods according to selectable time interval values included in an intercept configuration file.

20. The communication management system of claim 18, further comprising:

the management server configured to encrypt the log files according to an encryption key known by an enforcement agency associated with the warrant before emailing the encrypted log files to a mailbox for the enforcement agency.

21. The communication management system of claim 18, further comprising:

the management server configured to identify a first portion of the intercepted data encrypted using a first known security association for which the management server has knowledge of the encryption key and identify a second portion of the intercepted data encrypted using a second unknown security association, the management server configured to decrypt and store the first portion of the intercepted data into an associated one of the log files and combine the encrypted second portion of the intercepted data with the decrypted first portion of the intercepted data in the same associated log file.

22. The communication management system of claim 21, wherein the first portion of the intercepted data is encrypted with a known point-to-point encryption key and the second portion of the intercepted data is encrypted with an unknown end-to-end encryption key.

23. The communication management system of claim 21, further comprising:

the management server is configured to encrypt both the decrypted first portion of the intercepted data and the second encrypted portion of the intercepted data.

24. The communication management system of claim 21, wherein the first portion of the intercepted data includes transaction authentication and routing information and the second portion of the intercepted data includes the contents of email messages, electronic files, or other electronic data.

25. The communication management system of claim 17, wherein the management server is configured to process communications exchanged between a local device operating in an enterprise or local network and a mobile wireless device that synchronizes with a portion of the data in the local device.

*26. A method for intercepting data, comprising:*

*in response to receiving a connection request, negotiating a point-to-point encryption scheme with a mobile device, the point-to-point encryption scheme negotiated between a management server and the mobile device;*

*automatically intercepting, at the management server, data received and/or sent by an intercept target, wherein data is intercepted without altering operation of application services on the mobile device;*

*inspecting packets having the intercepted data to distinguish end-to-end encrypted information from other information that is encrypted according to the point-to-point encryption scheme negotiated with the device;*

*preserving encryption that is included on the end-to-end encrypted information when received while removing encryption that is included on at least a portion of the other information, said other information decrypted using a key obtained during the point-to-point encryption scheme negotiation; and*

*transferring both the decrypted other information and the end-to-end information.*

*27. The method of claim 26, further comprising, receiving, at the management server, a value identifying the intercept target for a legal intercept and an indication that interception is authorized by a warrant, the intercept target corresponding to the mobile device.*

*28. The method of claim 26, wherein the packets are intercepted during a requested time period, and the method further comprises: formatting the data that is intercepted during the requested time period and associated with a target user into one or more first log files.*

*29. The method of claim 28, wherein: each of the first log files corresponding to a different time segment occurring during the requested time period and indicating one or more intercept events for its corresponding time segment.*

*30. The method of claim 29, further comprising:*

*formatting one or more second different log files associated with the requested time period, the second log files indicating inactivity and corresponding to different remaining time segments that occur during the requested time period and that are unrepresented by the first log files that indicate the intercept events such that the first and second log files record monitoring for the entire requested time period independently of whether the data is intercepted intermittently during the requested time period.*

*31. The method of claim 28, wherein the log files record an unbroken sequence of continuous monitoring over the requested time period independently of whether the data is intercepted intermittently.*

*32. The method of claim 28, further comprising formatting the log files with different time values usable for verifying that communications from the mobile device were continuously monitored during the requested time period regardless of whether the data was intercepted intermittently.*

*33. The method of claim 26, wherein the data is intercepted according to an intercept configuration file that includes at least a intercept identifier and a user ID identifying a target user.*

*34. The method of claim 26, wherein the encryption that is included on the end-to-end encryption information uses a security association that is kept secret from the management.*

*35. The method of claim 26, further comprising determining whether to encrypt at least one of the end-to-end information and the decrypted information prior to said transferring.*

*36. The method according to claim 26, further comprising:*

*combining the end-to-end encrypted information of the intercepted data with the decrypted other information of the intercepted data in a log file.*

*37. The method according to claim 26, further comprising:*

*storing the intercepted data in a structure format that identifies when the data was intercepted and provides authentication that the stored intercepted data has not been altered or deleted.*

*38. The method according to claim 26, further comprising monitoring communications between a remote client and the device for multiple contiguous time periods.*

*39. The method according to claim 38, further comprising:*

*generating log files over an intercept period that encompasses the multiple contiguous time periods;*

*storing the log files in a same intercept directory.*

*40. The method according to claim 39, further comprising:*

*inserting a warrant identifier received together with the value into the intercept directory; and*

*generating a name for the intercept directory that identifies the intercept target and the intercept period over which the log files were generated.*

*41. The method according to claim 39, further comprising:*

*encrypting the log files in the intercept directory with an encryption scheme known by an agency issuing the warrant, said encryption performed using the management server that intercepted the data; and*

*sending the encrypted intercept directory to an electronic mailbox accessible by the agency.*

*42. The method according to claim 39, further comprising:*

*generating a Cyclic Redundancy Check (CRC) or other digital signature value for all of the log files in the intercept directory;*

*encrypting the resulting generated value; and*

*providing the encrypted generated value to the enforcement agency, said encrypted generated value sent in a different communication than the encrypted intercept directory, said encrypted generated value verifying that the log files have not been altered.*

*43. The method according to claim 26, further comprising:*

*reading an intercept configuration file that contains a warrant identifier, the value identifying the user, an enforcement agency known encryption key and an electronic mailbox address;*

*upon reading the intercept configuration file automatically intercepting data received and/or sent by the remote mobile device;*

*formatting any intercepted data into log files that identify when the data was intercepted; and*

*encrypting the log files using the encryption key.*

*44. The method according to claim 26, wherein the end-to-end encrypted information is associated with content and is protected with an end-to-end encryption scheme that is kept secret from any midpoints located between transmitting and receiving endpoints, and the other information is associated with transaction routing information and is protected with the point-to-point encryption scheme.*

*45. A communication management system for intercepting data, comprising:*

*a processor;*

*a network interface configured to receive a connection request; and*

*a memory unit having instructions stored thereon, wherein the instructions, when executed by the processor, causes the communication management system to:*

*negotiate a point-to-point encryption scheme;*

*inspect packets having the data to be intercepted to distinguish end-to-end encrypted information from other information that is encrypted according to the point-to-point encryption scheme;*

*preserve encryption that is included on the encrypted information when received while removing encryption that is included on at least a portion of the other information, said other information decrypted using a key obtained in association with the point-to-point encryption scheme;*

*transfer both the decrypted other information and the end-to-end encrypted information;*

*automatically format the intercepted data into log files including:*

*generating log files that identify intercepted data for associated contiguous predetermined time periods extending over a continuous intercept period; and*

*generating the log files for back-to-back time periods, the management server generating each log file by selecting between inserting the intercepted data and an inactivity indication therein such that each of the log files contains at least one selected from the group including the intercepted data for the associated time period and an indication that no data was intercepted during the associated time period;*

*negotiate the point-to-point encryption scheme with a mobile device in response to receiving the connection request, and*

*intercept data received and/or sent by an intercept target, wherein data is intercepted without altering operation of application services on the mobile device.*

* * * * *